US012669338B2

(12) United States Patent   (10) Patent No.: US 12,669,338 B2
Jin et al.   (45) Date of Patent: Jun. 30, 2026

(54) NAVIGATION METHOD, NAVIGATION SYSTEM, AND INTELLIGENT VEHICLE

(71) Applicant: Yinwang Intelligent Technologies Co., Ltd., Shenzhen (CN)

(72) Inventors: Xinyao Jin, Nanjing (CN); Guicheng Zhang, Nanjing (CN); Dezhi Qiao, Beijing (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 183 days.

(21) Appl. No.: 18/069,597

(22) Filed: Dec. 21, 2022

(65) Prior Publication Data
US 2023/0138903 A1 May 4, 2023

Related U.S. Application Data

(63) Continuation of application No. PCT/CN2020/098165, filed on Jun. 24, 2020.

(51) Int. Cl.
*G01C 21/34* (2006.01)
*G01C 21/36* (2006.01)

(52) U.S. Cl.
CPC ....... *G01C 21/343* (2013.01); *G01C 21/3492* (2013.01); *G01C 21/3626* (2013.01)

(58) Field of Classification Search
CPC .............. G01C 21/343; G01C 21/3492; G01C 21/3626; G01C 21/34; G01C 21/3407; G01C 21/3608; G01S 19/393; G01S 19/53; G01S 19/39
See application file for complete search history.

(56) References Cited

U.S. PATENT DOCUMENTS

| | | | |
|---|---|---|---|
| 2008/0004803 A1 | 1/2008 | Kikuchi | |
| 2019/0187715 A1* | 6/2019 | Zhang | G05D 1/0268 |
| 2019/0293440 A1* | 9/2019 | Hasemann | G06N 20/00 |
| 2020/0180612 A1* | 6/2020 | Finelt | B60W 60/0027 |
| 2020/0225044 A1* | 7/2020 | Tohriyama | G01C 21/3848 |

FOREIGN PATENT DOCUMENTS

| | | |
|---|---|---|
| CN | 1996039 A | 7/2007 |
| CN | 101122467 A | 2/2008 |
| CN | 103575283 A | 2/2014 |
| CN | 103764483 A | 4/2014 |
| CN | 104616520 A | 5/2015 |

(Continued)

OTHER PUBLICATIONS

KR-20090005942-U (Machine Translation) (Year: 2009).*

*Primary Examiner* — Navid Z. Mehdizadeh
*Assistant Examiner* — Micah Chuen-Him Cheng
(74) *Attorney, Agent, or Firm* — Conley Rose, P.C.

(57) ABSTRACT

A navigation method applied to an intelligent vehicle includes obtaining a navigation request, where the navigation request includes location information of a start place and location information of a destination that are of a vehicle; and navigating the vehicle based on the location information of the start place, the location information of the destination, and a heading of the vehicle, where the heading of the vehicle is determined based on a traveling track stored before the navigation request is obtained.

20 Claims, 26 Drawing Sheets

(56) References Cited

FOREIGN PATENT DOCUMENTS

| CN | 106323319 | A | | 1/2017 | | |
|----|-----------|---|---|--------|---|---|
| CN | 107664503 | A | | 2/2018 | | |
| CN | 108931253 | A | | 12/2018 | | |
| CN | 110160541 | A | | 8/2019 | | |
| CN | 110171416 | A | | 8/2019 | | |
| CN | 110457413 | A | | 11/2019 | | |
| CN | 111176269 | A | | 5/2020 | | |
| JP | 2000249566 | A | | 9/2000 | | |
| JP | 2002090161 | A | | 3/2002 | | |
| JP | 2012225683 | A | | 11/2012 | | |
| KR | 20090005942 | U | * | 6/2009 | ............ | G01C 21/34 |

* cited by examiner

Delete a track point
corresponding to gear N

Determine the track point
based on a traveling
speed of a vehicle

B

Turn around

Greater than 90°

GPS signal

GPS reference point

Cloud-side device

Interaction interface

Phone interconnection

Music

Navigati

NAVIGATION METHOD, NAVIGATION SYSTEM, AND INTELLIGENT VEHICLE

CROSS-REFERENCE TO RELATED APPLICATIONS

This application is a continuation application of International Patent Application No. PCT/CN2020/098165, filed on Jun. 24, 2020, which is hereby incorporated by reference in its entirety.

TECHNICAL FIELD

This application relates to the field of navigation technologies, and in particular, to a navigation method, a navigation system, and an intelligent vehicle.

BACKGROUND

A Global Positioning System (GPS) is a high-precision radio navigation positioning system based on an artificial earth satellite. The global positioning system can provide an accurate geographical location, a vehicle speed, and accurate time information on an earth's surface and in near earth space when not blocked by buildings or other obstacles.

Generally, in-vehicle navigation can use an in-vehicle GPS and an electronic map to perform path planning. Currently, navigation precision is low when a vehicle starts, and deviation correction is very likely to be performed. Therefore, how to improve navigation precision when a vehicle starts needs to be resolved without delay.

SUMMARY

Embodiments of this application provide a navigation method, to improve navigation precision of a vehicle, and in particular, to improve navigation precision when the vehicle starts.

To achieve the foregoing objective, the embodiments of this application provide the following technical solutions.

It should be understood that the navigation method provided in this application may be performed by an electronic apparatus. The electronic apparatus may be an entire computing device, or may be some components in the computing device, for example, a navigation-related chip. In an example, the electronic apparatus may be a terminal such as an automobile or a navigation device in an automobile, or may be a system chip or a navigation chip that can be disposed in the terminal. The system chip is also referred to as a system on a chip, or a system-on-a-chip (SoC) chip. In physical implementation, the navigation chip may be integrated inside the system chip, or may not be integrated with the system chip.

According to a first aspect of this application, a navigation method is provided, and the navigation method may include obtaining a navigation request, where the navigation request may include location information of a start place and location information of a destination that are of a vehicle. In a process of performing navigation by using a vehicle-mounted device, a name of the to-be-reached destination needs to be first entered into a navigation system provided by the vehicle-mounted device, and the vehicle-mounted device searches the navigation system and a navigation map based on the entered name of the to-be-reached destination, to determine the location information of the destination for this navigation. The vehicle-mounted device may also be referred to as in-vehicle navigation. When a difference between the vehicle-mounted device and the in-vehicle navigation is not emphasized, the vehicle-mounted device and the in-vehicle navigation represent a same meaning. The name of the to-be-reached destination may be entered by a user, or tapped on the navigation map, or selected from a menu provided by the vehicle-mounted device, or the like. The manner of entering by the user may include a manner in which the user enters the name by using a voice instruction, and a manner in which the user taps or touches the in-vehicle navigation application. The location information of the start place of the vehicle may also be obtained by entering a name of the start place into the navigation system provided by the vehicle-mounted device. Alternatively, the location information of the start place of the vehicle may be location information of a current location of the vehicle by default. Location information in this application may be represented by using longitude and latitude coordinates, or may be represented by using x and y coordinates, or may be represented by using any other symbol indicating a geographical location of the vehicle. In the solution provided in this application, a navigation route is generated based on the location information of the start place, the location information of the destination, and a heading of the vehicle, to perform navigation planning on the vehicle. It should be noted that in this application, performing navigation planning on the vehicle sometimes means vehicle navigating. It should be understood that both performing navigation planning on the vehicle and vehicle navigating are used to indicate that a next-step driving direction of the vehicle is prompted, or indicate that a navigation route is planned for the vehicle and a next-step driving direction of the vehicle is prompted. In a possible implementation, the next-step driving direction may be displayed on a user interaction interface of the vehicle-mounted device, for example, turning around or turning left. Alternatively, in a possible implementation, the planned route and the next-step driving direction may be displayed on the user interaction interface of the vehicle-mounted device. The heading of the vehicle is determined based on a traveling track stored before the navigation request is obtained. It can be learned from the first aspect that, different from the conventional technology that a navigation route is generated only based on location information of a start place and a location of a destination that are of a vehicle for vehicle navigation, the solution provided in this application introduces the heading of the vehicle in a process of generating the navigation route and navigating the vehicle. In this case, the navigation route is generated based on the location information of the start place, the location information of the destination, and the heading of the vehicle for navigation planning on the vehicle. According to the solution provided in this application, in a navigation scenario when the vehicle starts, deviation correction does not need to be performed until the vehicle travels for a specific distance and generates a track. According to the solution provided in this application, the heading of the vehicle may be used as a reference direction, and an accurate indication for a navigation start can be obtained without generating a track. In a navigation scenario of a driving process of the vehicle, a time required for deviation correction can be reduced, and navigation efficiency can be improved.

Optionally, with reference to the first aspect, in a first possible implementation, the navigating the vehicle based on the location information of the start place, the location information of the destination, and the heading of the vehicle may include: determining a first navigation direction based on the location information of the start place and the location information of the destination; and navigating the vehicle based on an included angle between the first navigation direction and the heading of the vehicle. It can be learned from the first possible implementation of the first aspect that a specific manner of navigating the vehicle based on the location information of the start place, the location information of the destination, and the heading of the vehicle is provided. First, a navigation direction, namely, the first navigation direction, is determined based on the location information of the start place and the location information of the destination. Then, deviation correction is performed on the first navigation direction based on the included angle between the first navigation direction and the heading of the vehicle. Further, a finally presented navigation direction is determined. The finally presented navigation direction may be used to prompt the user or the vehicle.

Optionally, with reference to the first possible implementation of the first aspect, in a second possible implementation, the navigating the vehicle based on an included angle between the first navigation direction and the heading of the vehicle may include: sending a prompt message when the included angle falls within a first preset range, where the prompt message is used to indicate the vehicle to turn around. It can be learned from the second possible implementation of the first aspect that a navigation manner in a specific application scenario is provided. When the included angle falls within the first preset range, it indicates that a direction of the destination may be opposite to the heading of the vehicle. In this case, the vehicle is indicated to turn around, so as to avoid that the vehicle travels for a specific distance in a direction that deviates from the destination to affect user experience. When it is determined that the included angle falls within the first preset range, the vehicle is prompted to turn around. This improves navigation precision.

Optionally, with reference to the first possible implementation of the first aspect, in a third possible implementation, the navigating the vehicle based on an included angle between the first navigation direction and the heading of the vehicle may include: sending a prompt message when the included angle falls within a second preset range, where the prompt message is used to indicate the vehicle to turn left or turn right. It can be learned from the third possible implementation of the first aspect that a navigation manner in an application scenario is provided. When the included angle falls within the second preset range, the vehicle is indicated to turn left or turn right. This improves navigation precision.

Optionally, with reference to the first possible implementation of the first aspect, in a fourth possible implementation, the navigating the vehicle based on an included angle between the first navigation direction and the heading of the vehicle may include: sending a prompt message when the included angle falls within a third preset range, where the prompt message is used to indicate the vehicle to travel in the first navigation direction. It can be learned from the fourth possible implementation of the first aspect that a navigation manner in an application scenario is provided.

Optionally, with reference to any one of the first aspect and the first to the fourth possible implementations of the first aspect, in a fifth possible implementation, the traveling track is a segment of traveling track that is at a preset distance from a current location of the vehicle, and the method may further include: obtaining N track points based on the traveling track, where the track point is used to indicate location information of the vehicle, and N is a positive integer; and determining the heading of the vehicle based on curvatures of the N track points. It can be learned from the fifth possible implementation of the first aspect that a manner of determining the heading of the vehicle is provided.

Optionally, with reference to the fifth possible implementation of the first aspect, in a sixth possible implementation, the determining the heading of the vehicle based on curvatures of the N track points may include, when a curvature change rate of the N track points is not greater than a first preset value, determining the heading of the vehicle based on location information of any two track points in the N track points. The first preset value is used to determine whether the N track points are on a straight line. For example, if N is 20, it means that there are 20 track points, a curvature change rate of the 20 track points is calculated, and the curvature change rate of the 20 track points is compared with the first preset value, for example, if the curvature change rate of the 20 track points is 0.3, and the first preset value is 0.5, because 0.3 is less than 0.5, it may be considered that the 20 track points are approximately distributed on a straight line, and the heading of the vehicle may be determined based on location information of any two track points in the 20 track points. It can be learned from the sixth possible implementation of the first aspect that a manner of determining the heading of the vehicle based on a curvature is provided. When the curvature change rate of the N track points is not greater than the first preset value, it may be considered that the N track points are on a straight line, and the heading of the vehicle may be determined based on the location information of any two track points in the N track points.

Optionally, with reference to the fifth possible implementation of the first aspect, in a seventh possible implementation, the determining the heading of the vehicle based on curvatures of the N track points may include, when a curvature change rate of the N track points is greater than a first preset value, determining the heading of the vehicle based on the curvature change rate of the N track points and a vehicle speed. It can be learned from the seventh possible implementation of the first aspect that a manner of determining the heading of the vehicle based on a curvature is provided. When the curvature change rate of the N track points is greater than the first preset value, it may be considered that the N track points are not on a straight line, it may be considered that the N track points are on a curve, and the heading of the vehicle is determined based on the curvature change rate of the N track points and the vehicle speed.

Optionally, with reference to the fifth to the seventh possible implementations of the first aspect, in an eighth possible implementation, the obtaining N track points based on the traveling track may include: determining a plurality of track points based on the traveling track; and deleting M track points in the plurality of track points based on a preset condition, to obtain the N track points, where the preset condition includes one or more of a first preset condition and a second preset condition, the first preset condition is that curvatures of the M track points are greater than a second preset value, and the second preset condition is that a vehicle gear corresponding to the M track points is a neutral gear, where M is a positive integer, and N is a positive integer. The second preset value is used to determine whether a scrap point or a defect point exists in the M track points. In an example, if curvatures of track points in the M track points are greater than the second preset value, it is considered that such a track point cannot appear in the traveling track, and the scrap point or the defect point can be deleted. It can be learned from the eighth possible implementation of the first aspect that a manner of determining the N track points is provided. N valid track points are selected from the plurality of track points to determine the heading of the vehicle, for example, deleting a defect point whose curvature is greater than the second preset value, or a track point that is in the track points and at which a corresponding vehicle gear is the neutral gear.

Optionally, with reference to the fifth to the eighth possible implementations of the first aspect, in a ninth possible implementation, the method may further include: obtaining steering wheel angle information when it is detected that the vehicle speed is less than a third preset value; determining a compensation direction based on the steering wheel angle information, a wheel track, duration, and the speed, where the duration is required duration from a moment at which it is detected that the vehicle speed is less than the third preset value to a moment at which the vehicle stops, and the speed is a real-time speed of the vehicle after it is detected that the vehicle speed is less than the third preset value; and updating, based on the compensation direction, the heading of the vehicle determined based on the curvatures of the N track points. It can be learned from the ninth possible implementation of the first aspect that, when the track points change in a small range, a direction may not be accurately predicted based on the traveling track determined by the GPS. Therefore, a final heading of the vehicle is jointly determined based on the compensation direction and a direction determined based on the traveling track. This improves navigation precision. For example, the final heading of the vehicle may be determined by summing two directions. The two directions are respectively the compensation direction and the direction determined based on the traveling track.

According to a second aspect of this application, a navigation system is provided. The navigation system may include a mobile terminal and a vehicle. The mobile terminal obtains a navigation request. The navigation request may include location information of a start place and location information of a destination that are of the vehicle. In response to the navigation request, the mobile terminal sends an instruction to the vehicle or a navigation module of the vehicle. The instruction is used to instruct the vehicle or the navigation module of the vehicle to send a heading of the vehicle. In response to the instruction, the vehicle or the navigation module of the vehicle sends the heading of the vehicle to the mobile terminal. The heading of the vehicle is determined based on a traveling track stored in the vehicle. The mobile terminal navigates the vehicle based on the location information of the start place, the location information of the destination, and the heading of the vehicle. It can be learned from the second aspect that the solution provided in this application may be interactively executed by two devices, and the mobile terminal may perform route planning on the vehicle, to navigate the vehicle.

Optionally, with reference to the second aspect, in a first possible implementation, that the mobile terminal navigates the vehicle based on the location information of the start place, the location information of the destination, and the heading of the vehicle may include: The mobile terminal determines a first navigation direction based on the location information of the start place and the location information of the destination. The mobile terminal navigates the vehicle based on an included angle between the first navigation direction and the heading of the vehicle.

Optionally, with reference to the first possible implementation of the second aspect, in a second possible implementation, the mobile terminal is configured to send a prompt message when the included angle falls within a first preset range. The prompt message is used to indicate the vehicle to turn around.

Optionally, with reference to the first possible implementation of the second aspect, in a third possible implementation, the mobile terminal is configured to send a prompt message when the included angle falls within a second preset range. The prompt message is used to indicate the vehicle to turn left or turn right.

Optionally, with reference to the first possible implementation of the second aspect, in a fourth possible implementation, the mobile terminal is configured to send a prompt message when the included angle falls within a third preset range. The prompt message is used to indicate the vehicle to travel in the first navigation direction.

Optionally, with reference to any one of the second aspect and the first to the fourth possible implementations of the second aspect, in a fifth possible implementation, the traveling track is a segment of traveling track that is at a preset distance from a current location of the vehicle, and the vehicle is further configured to: obtain N track points based on the traveling track, where the track point is used to indicate location information of the vehicle, and N is a positive integer; and determine the heading of the vehicle based on curvatures of the N track points.

Optionally, with reference to the fifth possible implementation of the second aspect, in a sixth possible implementation, the vehicle is configured to, when a curvature change rate of the N track points is not greater than a first preset value, determine the heading of the vehicle based on location information of any two track points in the N track points.

Optionally, with reference to the fifth possible implementation of the second aspect, in a seventh possible implementation, the vehicle is configured to, when a curvature change rate of the N track points is greater than a first preset value, determine the heading of the vehicle based on the curvature change rate of the N track points and a vehicle speed.

Optionally, with reference to the fifth to the seventh possible implementations of the second aspect, in an eighth possible implementation, the vehicle is configured to determine a plurality of track points based on the traveling track; and delete M track points in the plurality of track points based on a preset condition, to obtain the N track points, where the preset condition includes one or more of a first preset condition and a second preset condition, the first preset condition is that curvatures of the M track points are greater than a second preset value, and the second preset condition is that a vehicle gear corresponding to the M track points is a neutral gear, where M is a positive integer, and N is a positive integer.

Optionally, with reference to the fifth to the eighth possible implementations of the second aspect, in a ninth possible implementation, the vehicle is further configured to: obtain steering wheel angle information when it is detected that the vehicle speed is less than a third preset value; determine a compensation direction based on the steering wheel angle information, a wheel track, duration, and the speed, where the duration is required duration from a moment at which it is detected that the vehicle speed is less than the third preset value to a moment at which the vehicle stops, and the speed is a real-time speed of the vehicle after it is detected that the vehicle speed is less than the third preset value; and update, based on the compensation direction, the heading of the vehicle determined based on the curvatures of the N track points.

According to a third aspect of this application, a navigation device is provided, and the navigation device may include: a first obtaining module, configured to obtain a navigation request, where the navigation request may include location information of a start place and location information of a destination that are of a vehicle; and a navigation module, configured to navigate the vehicle based on the location information of the start place, the location information of the destination, and a heading of the vehicle that are obtained by the first obtaining module, where the heading of the vehicle is determined based on a traveling track stored before the navigation request is obtained.

Optionally, with reference to the third aspect, in a first possible implementation, the navigation module is configured to determine a first navigation direction based on the location information of the start place and the location information of the destination; and navigate the vehicle based on an included angle between the first navigation direction and the heading of the vehicle.

Optionally, with reference to the first possible implementation of the third aspect, in a second possible implementation, the navigation module is configured to send a prompt message when the included angle falls within a first preset range. The prompt message is used to indicate the vehicle to turn around.

Optionally, with reference to the first possible implementation of the third aspect, in a third possible implementation, the navigation module is configured to send a prompt message when the included angle falls within a second preset range. The prompt message is used to indicate the vehicle to turn left or turn right.

Optionally, with reference to the first possible implementation of the third aspect, in a fourth possible implementation, the navigation module is configured to send a prompt message when the included angle falls within a third preset range. The prompt message is used to indicate the vehicle to travel in the first navigation direction.

Optionally, with reference to any one of the third aspect and the first to the fourth possible implementations of the third aspect, in a fifth possible implementation, the traveling track is a segment of traveling track that is at a preset distance from a current location of the vehicle. The device may further include a second obtaining module and a processing module. The second obtaining module is configured to obtain N track points based on the traveling track, where the track point is used to indicate location information of the vehicle, and N is a positive integer. The processing module is configured to determine the heading of the vehicle based on curvatures of the N track points obtained by the second obtaining module.

Optionally, with reference to the fifth possible implementation of the third aspect, in a sixth possible implementation, the processing module is configured to, when a curvature change rate of the N track points is not greater than a first preset value, determine the heading of the vehicle based on location information of any two track points in the N track points.

Optionally, with reference to the fifth possible implementation of the third aspect, in a seventh possible implementation, the processing module is configured to, when a curvature change rate of the N track points is greater than a first preset value, determine the heading of the vehicle based on the curvature change rate of the N track points and a vehicle speed.

Optionally, with reference to the fifth to the seventh possible implementations of the third aspect, in an eighth possible implementation, the second obtaining module is configured to determine a plurality of track points based on the traveling track. The processing module is configured to delete M track points in the plurality of track points based on a preset condition, to obtain the N track points. The preset condition includes one or more of a first preset condition and a second preset condition, the first preset condition is that curvatures of the M track points are greater than a second preset value, and the second preset condition is that a vehicle gear corresponding to the M track points is a neutral gear, where M is a positive integer, and N is a positive integer.

Optionally, with reference to the fifth to the eighth possible implementations of the third aspect, in a ninth possible implementation, the device may further include a third obtaining module. The third obtaining module is configured to obtain steering wheel angle information when it is detected that the vehicle speed is less than a third preset value. The processing module is further configured to determine a compensation direction based on the steering wheel angle information, a wheel track, duration, and the speed. The duration is required duration from a moment at which it is detected that the vehicle speed is less than the third preset value to a moment at which the vehicle stops, and the speed is a real-time speed of the vehicle after it is detected that the vehicle speed is less than the third preset value. The processing module is further configured to update, based on the compensation direction, the heading of the vehicle determined based on the curvatures of the N track points.

According to a fourth aspect of this application, a vehicle is provided, and may include a processor. The processor is coupled to a memory, the memory stores program instructions, and when the program instructions stored in the memory are executed by the processor, the method described in any one of the first aspect or the possible implementations of the first aspect is implemented.

According to a fifth aspect of this application, a vehicle is provided, and may include a processor and a communications interface. The processor obtains program instructions through the communications interface, and when the program instructions are executed by the processor, the method described in any one of the first aspect or the possible implementations of the first aspect is implemented.

According to a sixth aspect of this application, a computer-readable storage medium is provided, including instructions. When the instructions are run on a computer, the computer is enabled to perform the method according to any one of the first aspect or the possible implementations of the first aspect.

According to a seventh aspect of this application, a vehicle is provided, and the vehicle may include a processing circuit. The processing circuit is configured to perform the method described in any one of the first aspect or the possible implementations of the first aspect.

According to an eighth aspect of this application, a chip system is provided. The chip system may include a processor, configured to support a vehicle in implementing the functions in the method described in any one of the first aspect or the possible implementations of the first aspect.

Optionally, with reference to the eighth aspect, in a first possible implementation, the chip system may further include a memory, and the memory is configured to store program instructions and data that are necessary for the vehicle. The chip system may include a chip, or may include a chip and another discrete device. The chip system may include an application-specific integrated circuit (ASIC), a field-programmable gate array (FPGA), or another programmable logic device. Further, the chip system may further include an interface circuit, and the like.

According to a ninth aspect of this application, a navigation system is provided. The navigation system includes a vehicle and a cloud-side device. The vehicle obtains a navigation request. The navigation request includes location information of a start place and location information of a destination that are of the vehicle. In response to the navigation request, the vehicle or a navigation module of the vehicle sends the location information of the destination and first information to the cloud-side device. The first information includes at least one of a heading of the vehicle and the location information of the start place. The cloud-side device performs navigation planning on the vehicle based on the location information of the start place, the location information of the destination, and the heading of the vehicle.

Optionally, with reference to the ninth aspect, in a first possible implementation, that the cloud-side device navigates the vehicle based on the location information of the start place, the location information of the destination, and the heading of the vehicle may include: The cloud-side device determines a first navigation direction based on the location information of the start place and the location information of the destination. The cloud-side device navigates the vehicle based on a relationship between a preset angle and an included angle between the first navigation direction and the heading of the vehicle.

Optionally, with reference to the first possible implementation of the ninth aspect, in a second possible implementation, the cloud-side device is configured to send a prompt message when the included angle falls within a first preset range. The prompt message is used to indicate the vehicle to turn around.

Optionally, with reference to the first possible implementation of the ninth aspect, in a third possible implementation, the cloud-side device is configured to send a prompt message when the included angle falls within a second preset range. The prompt message is used to indicate the vehicle to turn left or turn right.

Optionally, with reference to the first possible implementation of the ninth aspect, in a fourth possible implementation, the cloud-side device is configured to send a prompt message when the included angle falls within a third preset range. The prompt message is used to indicate the vehicle to travel in the first navigation direction.

Optionally, with reference to any one of the ninth aspect and the first to the fourth possible implementations of the ninth aspect, in a fifth possible implementation, the traveling track is a segment of traveling track that is at a preset distance from a current location of the vehicle, and the vehicle is further configured to: obtain N track points based on the traveling track, where the track point is used to indicate location information of the vehicle, and N is a positive integer; and determine the heading of the vehicle based on curvatures of the N track points.

Optionally, with reference to the fifth possible implementation of the ninth aspect, in a sixth possible implementation, the vehicle is configured to, when a curvature change rate of the N track points is not greater than a first preset value, determine the heading of the vehicle based on location information of any two track points in the N track points.

Optionally, with reference to the fifth possible implementation of the ninth aspect, in a seventh possible implementation, the vehicle is configured to, when a curvature change rate of the N track points is greater than a first preset value, determine the heading of the vehicle based on the curvature change rate of the N track points and a vehicle speed.

Optionally, with reference to the fifth to the seventh possible implementations of the ninth aspect, in an eighth possible implementation, the vehicle is configured to determine a plurality of track points based on the traveling track; and delete M track points in the plurality of track points based on a preset condition, to obtain the N track points. The preset condition includes one or more of a first preset condition and a second preset condition, the first preset condition is that curvatures of the M track points are greater than a second preset value, and the second preset condition is that a vehicle gear corresponding to the M track points is a neutral gear. Optionally, with reference to the fifth to the eighth possible implementations of the ninth aspect, in a ninth possible implementation, the vehicle is further configured to: obtain steering wheel angle information when it is detected that the vehicle speed is less than a third preset value; determine a compensation direction based on the steering wheel angle information, a wheel track, duration, and the speed, where the duration is required duration from a moment at which it is detected that the vehicle speed is less than the third preset value to a moment at which the vehicle stops, and the speed is a real-time speed of the vehicle after it is detected that the vehicle speed is less than the third preset value; and update, based on the compensation direction, the heading of the vehicle determined based on the curvatures of the N track points.

According to a tenth aspect of this application, a mobile terminal is provided. The mobile terminal includes a first obtaining module, configured to obtain a navigation request, where the navigation request includes location information of a start place and location information of a destination; a communications module, configured to send an instruction to the vehicle or a navigation module of the vehicle in response to the navigation request, where the instruction is used to instruct the vehicle or the navigation module of the vehicle to send heading of the vehicle information, and the communications module is further configured to receive the heading of the vehicle information sent by the vehicle or the navigation module of the vehicle, where the heading of the vehicle information is determined based on a stored traveling track; and a navigation module, configured to perform navigation planning on the vehicle based on the location information of the start place, the location information of the destination, and the heading of the vehicle information.

Optionally, with reference to the tenth aspect, in a first possible implementation, the navigation module is configured to determine a first navigation direction based on the location information of the start place and the location information of the destination; and navigate the vehicle based on an included angle between the first navigation direction and a heading of the vehicle.

Optionally, with reference to the first possible implementation of the tenth aspect, in a second possible implementation, the navigation module is configured to send a prompt message when the included angle falls within a first preset range. The prompt message is used to indicate the vehicle to turn around.

Optionally, with reference to the first possible implementation of the tenth aspect, in a third possible implementation, the navigation module is configured to send a prompt message when the included angle falls within a second preset range. The prompt message is used to indicate the vehicle to turn left or turn right.

Optionally, with reference to the first possible implementation of the tenth aspect, in a fourth possible implementation, the navigation module is configured to send a prompt message when the included angle falls within a third preset range. The prompt message is used to indicate the vehicle to travel in the first navigation direction.

Optionally, with reference to any one of the tenth aspect and the first to the fourth possible implementations of the tenth aspect, in a fifth possible implementation, the traveling track is a segment of traveling track that is stored before the navigation request is obtained and that is at a preset distance from a current location of the vehicle. The traveling track includes the N track points. The track point is used to indicate location information of the vehicle. The heading of the vehicle information includes the curvatures of the N track points. Optionally, with reference to the fourth possible implementation of the tenth aspect, in a sixth possible implementation, the communications module is further configured to receive compensation direction information of the vehicle. The compensation direction information is used to update the heading of the vehicle determined based on the heading of the vehicle information, and the compensation direction information includes steering wheel information, a wheel track, duration, and a speed. The steering wheel information is steering wheel angle information obtained when the vehicle detects that the vehicle speed is less than a third preset value, the duration is required duration from a moment at which the vehicle detects that the vehicle speed is less than the third preset value to a moment at which the vehicle stops, and the speed is a real-time speed of the vehicle. The compensation direction information that is of the vehicle and that is received by the communications module of the mobile terminal may come from different devices. For example, the communications module may receive compensation direction information sent by the vehicle or the navigation module of the vehicle, or the communications module may receive compensation direction information that is of the vehicle and that is sent by a cloud-side device.

It should be noted that beneficial effects brought by the implementations of the second aspect to the tenth aspect of this application may be understood with reference to the implementations of the first aspect. Therefore, details are not repeated.

In the technical solution provided in this application, navigation may be performed on a vehicle based on location information of a start place, location information of a destination, and a heading of the vehicle. In the solution provided in this application, the heading of the vehicle may be used as a reference direction, and accurate navigation can be performed on the vehicle without generating a track, and in particular, accurate navigation can be provided when the vehicle starts.

DESCRIPTION OF EMBODIMENTS

The following further describes technical solutions provided in this application with reference to the accompanying drawings and embodiments. It should be understood that a system structure and a service scenario provided in the embodiments of this application are mainly intended to describe possible implementations of the technical solutions in this application, and should not be construed as a unique limitation on the technical solutions in this application. A person of ordinary skill in the art may know that, with evolution of the system structure and emergence of new service scenarios, the technical solutions provided in this application are also applicable to a similar technical problem.

A vehicle described in this application may be an internal combustion engine vehicle that uses an engine as a power source, a hybrid vehicle that uses an engine and an electric motor as a power source, an electric vehicle that uses an electric motor as a power source, or the like.

Figure 1:
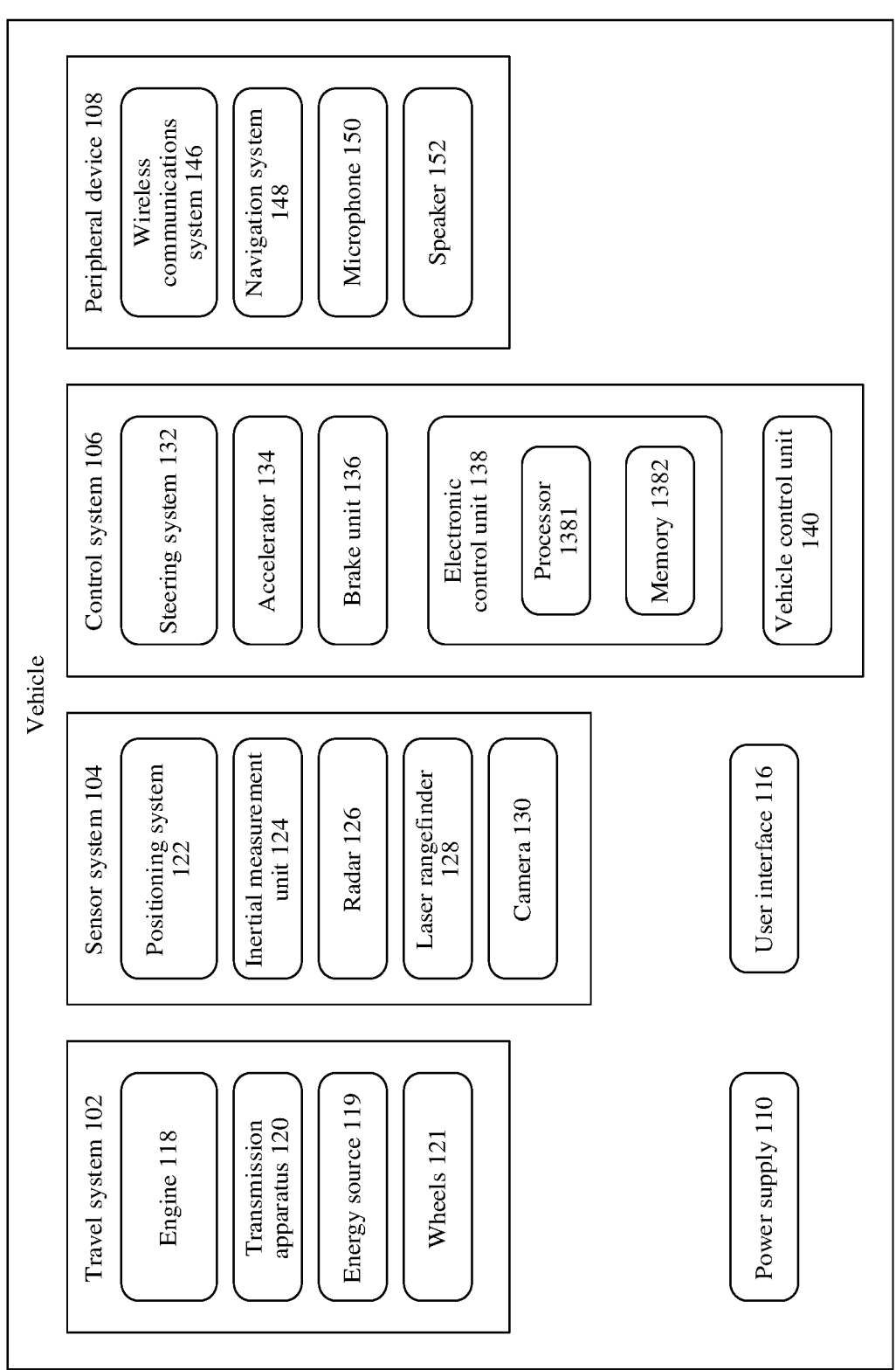
FIG. 1 is a schematic diagram of a structure of a vehicle according to an embodiment of this application.

To facilitate understanding of this solution, a structure of the vehicle is first described in an embodiment of this application with reference to FIG. 1. FIG. 1 is a schematic diagram of a structure of the vehicle according to this embodiment of this application.

The vehicle may include various subsystems, such as a travel system 102, a sensor system 104, a control system 106, one or more peripheral devices 108, a power supply 110, and a user interface 116. Optionally, the vehicle may include more or fewer subsystems, and each subsystem may include a plurality of components. In addition, each subsystem and component of the vehicle may be interconnected in a wired or wireless manner (for example, BLUETOOTH).

The travel system 102 may include a component that provides power for the vehicle to move. In an embodiment, the travel system 102 may include an engine 118, an energy source 119, a transmission apparatus 120, and wheels 121.

The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy. Examples of the energy source 119 include gasoline, diesel, other oil-based fuels, propane, other compressed gas-based fuels, ethanol, solar panels, batteries, and other power sources. The energy source 119 may also provide energy for another system of the vehicle. The transmission apparatus 120 may transmit mechanical power from the engine 118 to the wheels 121. The transmission apparatus 120 may include a gearbox, a differential, and a drive shaft. In an embodiment, the transmission apparatus 120 may further include another component, for example, a clutch. The drive shaft may include one or more shafts that may be coupled to the wheels 121.

The sensor system 104 may include a plurality of sensors that sense location information of the vehicle. For example, the sensor system 104 may include a positioning system 122 (the positioning system may be GPS, a BEIDOU system, or another positioning system), an inertial measurement unit (IMU) 124, radar 126, a laser rangefinder 128, and a camera 130. The sensor system 104 may further include sensors (for example, an in-vehicle air quality monitor, a fuel gauge, and an oil temperature gauge) in an internal system of the monitored vehicle. Sensor data from one or more of these sensors can be used to detect an object and corresponding features (for example, a location, a shape, a direction, and a speed) of the object. Such detection and identification are key functions of security operations of an autonomous vehicle.

The positioning system 122 may be configured to estimate a geographical location of the vehicle, for example, longitude and latitude information of the vehicle. The IMU 124 is configured to sense a location and orientation change of the vehicle based on inertial acceleration. In an embodiment, the IMU 124 may be a combination of an accelerometer and a gyroscope. The radar 126 may sense an object in the ambient environment of the vehicle by using a radio signal, and may be represented as millimeter-wave radar or laser radar. In some embodiments, in addition to sensing the object, the radar 126 may be further configured to sense a speed and/or a heading direction of the object. The laser rangefinder 128 may sense, by using a laser, an object in an environment in which the vehicle is located. In some embodiments, the laser rangefinder 128 may include one or more laser sources, a laser scanner, one or more detectors, and another system component. The camera 130 may be configured to capture a plurality of images of the ambient environment of the vehicle. The camera 130 may be a static camera or a video camera.

The control system 106 controls operations of the vehicle and the components of the vehicle. The control system 106 may include various components including a steering system 132, an accelerator 134, a brake unit 136, an electronic control unit (ECU) 138, and a vehicle control unit (for example, a body control module (BCM)) 140.

The steering system 132 may operate to adjust a heading direction of the vehicle. For example, in an embodiment, the steering system 132 may be a steering wheel system. The accelerator 134 is configured to control an operating speed of the engine 118 and further control a vehicle speed. The brake unit 136 is configured to control the vehicle to decelerate. The brake unit 136 may use friction to slow down the wheels 121. In another embodiment, the brake unit 136 may convert kinetic energy of the wheels 121 into a current. The brake unit 136 may alternatively use another form to reduce a rotational speed of the wheels 121, so as to control the vehicle speed. The electronic control unit 138 of the vehicle may be implemented as a single ECU or a plurality of ECUs on the vehicle. The single ECU or the plurality of ECUs is/are configured to communicate with the peripheral device 108 and the sensor system 104. The ECU 138 of the vehicle may include at least one processor 1381 and a memory (read-only memory (ROM)) 1382. The at least one processor may be implemented or executed by using one or more general-purpose processors, a content addressable memory, a digital signal processor, an application-specific integrated circuit, a field programmable gate array, any suitable programmable logic device, a discrete gate or transistor logic, a discrete hardware component, or any combination designed to perform the functions described herein. In particular, the at least one processor may be implemented as one or more microprocessors, controllers, micro controller units (MCUs), or state machines. In addition, the at least one processor may be implemented as a combination of computing devices, such as a digital signal processor or microprocessor, a plurality of microprocessors, one or more microprocessors combined with a digital signal processor core, or any other combination of such configurations. The ROM may provide data storage, including storage of an address, a route, and a driving direction in this application.

The BCM 140 may provide information about engine status, speed, gear, steering wheel angle, and the like of the vehicle to the ECU 138.

The vehicle interacts with an external sensor, another vehicle, another computer system, or a user through the peripheral device 108. The peripheral device 108 may include a wireless communications system 146, a navigation system 148, a microphone 150, and/or a speaker 152. In some embodiments, the peripheral device 108 provides a means for the user of the vehicle to interact with the user interface 116. For example, the navigation system 148 may be implemented as part of an in-vehicle entertainment system, an in-vehicle display system, an in-vehicle instrument cluster, or the like. In a practical embodiment, the navigation system 148 is implemented to include or cooperate with the sensor system 104. The sensor system 104 derives a current geographical location of the vehicle in real time or substantially in real time. The navigation system 148 is configured to provide navigation data to a driver of the vehicle. The navigation data may include location data of the vehicle, suggested route planned traveling indications, and visible map information for a vehicle operator. The navigation system 148 may present the location data to the driver of the vehicle through a display element or another presenting device. The current location of the vehicle may be described by using one or more of the following information: a triangulation location, a latitude/longitude location, x and y coordinates, or any other symbol or any measurement that indicates the geographical location of the vehicle.

The user interface 116 may further operate the navigation system 148 to receive a user input. The navigation system 148 may be operated through a touchscreen. The navigation system 148 provides a route planning capability and a navigation capability as the user enters geographical location values of start and end points. In another case, the peripheral device 108 may provide a means for the vehicle to communicate with another device located in the vehicle. For example, the microphone 150 may receive audio (for example, a voice command or another audio input) from the user of the vehicle. Similarly, the speaker 152 may output audio to the user of the vehicle. The wireless communications system 146 may communicate with one or more devices directly or through a communications network. For example, the wireless communications system 146 may use 3G cellular communication such as code division multiple access (CDMA), EVD0, or Global System for Mobile Communications (GSM)/general packet radio service (general packet radio service, GPRS), or 4G cellular communication such as Long-Term Evolution (LTE), or 5G cellular communication. The wireless communications system 146 may communicate with a wireless local area network (WLAN) by using WIFI. In some embodiments, the wireless communications system 146 may directly communicate with a device by using an infrared link, BLUETOOTH, or ZIGBEE. Other wireless protocols, for example, various vehicle communications systems, such as the wireless communications system 146, may include one or more dedicated short-range communications (DSRC) devices, and these devices may include public and/or private data communication between the vehicle and/or roadside stations.

The power supply 110 may supply power to various components of the vehicle. In an embodiment, the power supply 110 may be a rechargeable lithium-ion or lead-acid battery. One or more battery packs of such a battery may be configured as a power supply to supply power to the various components of the vehicle. In some embodiments, the power supply 110 and the energy source 119 may be implemented together, for example, in some pure electric vehicles.

Optionally, one or more of the foregoing components may be installed separately from or associated with the vehicle. For example, the memory 1382 may exist partially or entirely separate from the vehicle. The foregoing components may be communicatively coupled together in a wired and/or wireless manner.

Optionally, the foregoing components are merely examples. In actual application, components in the foregoing modules may be added or deleted based on an actual requirement. FIG. 1 should not be understood as a limitation on this embodiment of this application.

The vehicle may be a car, a truck, a motorcycle, a bus, a boat, a lawn mower, a recreational vehicle, a playground vehicle, a construction device, a trolley, a golf cart, a handcart, or the like. This is not limited in this embodiment of this application.

The foregoing describes an architectural diagram of a system to which the embodiments of this application are applicable with reference to FIG. 1. To better understand the technical solutions provided in the embodiments of this application, the following describes a research approach of the technical solutions described in this application.

FIG. 1 describes the navigation system by mentioning that the navigation system is configured to provide the navigation data to the driver of the vehicle. In one manner, current location information of the vehicle may be obtained when navigation is set. For example, longitude and latitude information of the vehicle is obtained by using the GPS, route planning is performed based on location information of a destination, and navigation is started. In this solution, after traveling for a specific distance to generate a traveling track, the vehicle performs navigation deviation correction, and prompts the user of a next-step driving direction. In an example, after the vehicle has the traveling track, a current navigation route direction is compared, and if the current navigation route direction is consistent, the navigation continues; or if the current navigation route direction is inconsistent, deviation correction is automatically performed, and that the navigation has been updated is prompted. In this solution, deviation correction probably needs to be performed, especially when the navigation is started while the vehicle is stationary. This deviation correction solution cannot effectively indicate a driving direction when the vehicle is stationary. However, correct driving direction indication during starting of the vehicle is widely used in a driving scenario.

To resolve the foregoing problem, this application provides a navigation method. A driving direction of a vehicle is predicted based on a historical track. After navigation starts, the predicted driving direction may be compared with a driving direction of a navigation route, to automatically correct to an accurate driving direction, so that the navigation can accurately indicate a correct next-step driving direction of the vehicle. This improves navigation accuracy and improves experience of a driver.

Based on the foregoing research approach, the following describes the technical solutions provided in this application.

Figure 2:
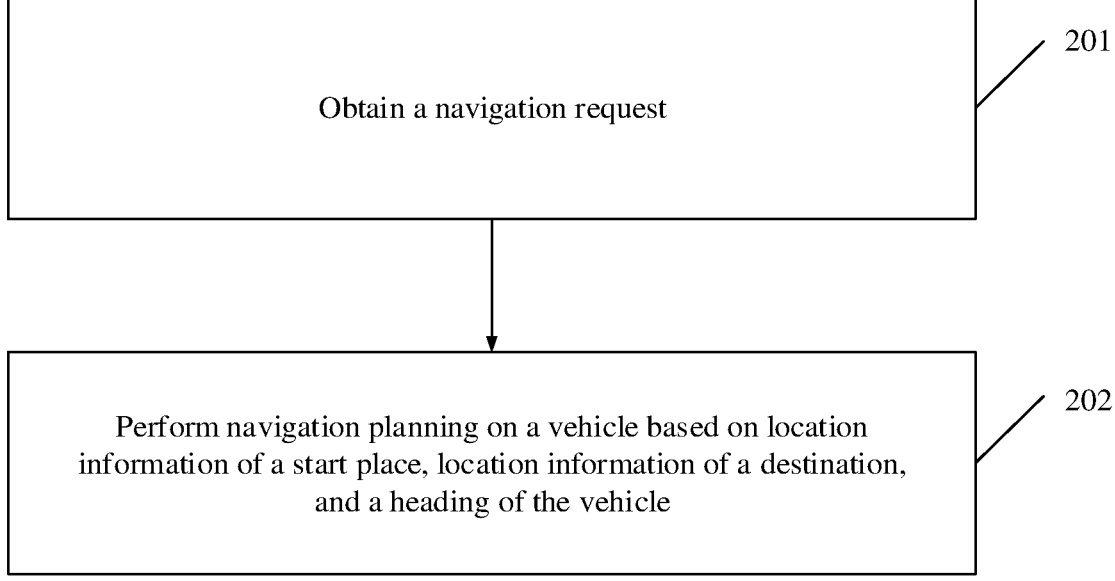
FIG. 2 is a schematic flowchart of a navigation method according to an embodiment of this application.

FIG. 2 is a schematic flowchart of a navigation method according to an embodiment of this application.

As shown in FIG. 2, the navigation method provided in this embodiment of this application may include the following steps:

201: Obtain a navigation request.

A manner of obtaining the navigation request is not limited in this embodiment of this application. The navigation request may include location information of a start place and location information of a destination that are of a vehicle. For example, the vehicle may obtain the navigation request by tapping or touching a screen of in-vehicle navigation by a user, or may obtain the navigation request by using a voice instruction of the user. For example, the following describes the two manners.

In a possible implementation, an action of enabling the in-vehicle navigation by the user is obtained, for example, an action of tapping or touching the in-vehicle navigation application and starting and running the in-vehicle navigation. A name of the start place and a name of the destination that are entered by the user in the in-vehicle navigation may be obtained, and a navigation system and a navigation map may be searched, to determine the location information of the start place and the location information of the destination of the current navigation. It should be noted that the location information of the start place of the vehicle may be location information of a current location of the vehicle by default. There is no need to repeatedly enter the name of the start place of the vehicle to obtain the location information of the start place. In addition, a name of a to-be-reached destination may be entered by the user, or tapped on the navigation map, or selected from a menu provided by a vehicle-mounted device, or the like. This is not limited in this embodiment of this application.

In a possible implementation, the action of enabling the in-vehicle navigation by the user may be obtained by using the vehicle (vehicle-mounted device), to start and run the in-vehicle navigation, and send the obtained name of the start place and the name of the destination to a server, and the server determines the location information of the start place and the location information of the destination based on the name of the start place and the name of the destination.

In a possible implementation, the navigation request may be obtained by using the voice instruction. For example, the navigation request may be initiated by using a voice assistant built in the vehicle. For example, the user may send the voice instruction to specify the name of the destination. It should be noted that, in this application, the start place is sometimes referred to as a begin point, a starting point, or a start address. When a difference between these terms is not emphasized, a same meaning is expressed. In this application, the destination is also sometimes referred to as a termination point or an ending point. When a difference between these terms is not emphasized, a same meaning is expressed.

In a possible implementation, the location information of the destination may be further pushed based on a use habit of the user. For example, in a possible application scenario, the user sets a commuting time period, a company address, and a home address in advance. When the user uses the vehicle-mounted device to perform navigation in an off-duty time period, the vehicle-mounted device may display the home address as the destination, and the user only needs to determine that the destination is home, and does not need to repeatedly enter an address of the destination. Alternatively, in another possible application scenario, the vehicle-mounted navigation device may automatically push the destination to the user based on frequency of a start place and frequency of a destination that are set in a historical navigation request of the user, and the user only needs to perform confirming, and does not need to repeatedly enter an address of the destination. For example, in the historical navigation request of the user, there is a high probability that the company is set as the start place and home is set as the destination, or home is set as the start place and the company is set as the destination. In this case, when learning that a current location of the vehicle is the company, the vehicle-mounted navigation device may push a suggested destination, for example, home; or when learning that a current location of the vehicle is home, the vehicle-mounted navigation device displays a suggestion suggesting to set the company as the destination.

202: Perform navigation planning on the vehicle based on the location information of the start place, the location information of the destination, and a heading of the vehicle.

In a possible implementation, a first navigation direction is determined based on the location information of the start place and the location information of the destination, and navigation planning is performed on the vehicle based on an included angle between the first navigation direction and the heading of the vehicle.

The navigation system can automatically plan a corresponding navigation direction and navigation route based on a satellite positioning system, electronic map data, the location information of the start place, and the location information of the destination according to an optimal path algorithm. The navigation direction obtained through direct planning based on the location information of the start place and the location information of the destination is the first navigation direction mentioned in this application.

However, the first navigation direction obtained through direct planning based on the location information of the start place and the location information of the destination has a disadvantage. When the current location of the vehicle is not on an optimal path provided by an existing navigation system, the vehicle cannot reach the destination according to the optimal path. In this case, the system can only recalculate an optimal path based on the current location point and the destination that are of the vehicle, that is, deviation correction needs to be performed. In other words, a driving direction of the vehicle can be obtained only after the vehicle starts to travel, so as to determine whether a current driving direction deviates from the navigation route.

In this application, when navigation is performed on the vehicle, the heading of the vehicle is considered. The heading of the vehicle may be determined based on a traveling track stored before the navigation request is obtained.

According to the solution provided in this application, when the vehicle is in a normal use state, the traveling track of the vehicle is recorded, and the heading of the vehicle is determined based on the traveling track. The normal use state of the vehicle includes that the vehicle is in a traveling state and the vehicle is in a non-parked state. In a possible implementation, whether the vehicle is in the normal use state may be determined based on a vehicle gear. For example, if the vehicle is in a P gear (a park gear or a parking gear), it is determined that the vehicle is in an abnormal use state. The P gear is used when the engine is off or the vehicle is stationary. When the gear is put into the P gear, a brake apparatus of the vehicle is locked, and the vehicle does not move even if the vehicle is parked on a slope. If the vehicle is in a non-P gear such as D gear (drive), N gear (neutral), and R gear (reverse), the traveling track of the vehicle is recorded.

In a possible implementation, the traveling track may be some track points including location information. The navigation device, an inertial measurement unit, and a dashcam all can record GPS information of the current location. The GPS information may include latitude and longitude information of the current location. The latitude and longitude information may represent location information of the vehicle. For example, longitude and latitude information of a current location in the GPS information is extracted and recorded at intervals or distances. Such a recording point may be referred to as the track point. Longitude and latitude information of a series of track points is referred to as a route track or a traveling track. In other words, it may be considered that in a possible implementation, the track point may be a location point recorded during GPS positioning.

In the solution provided in this application, a traveling track may be collected based on a traveling speed and a change of a gear that are of a vehicle. The following uses FIG. 3 as an example to describe how to obtain the traveling track. In a traveling process, location information of the vehicle may be collected at a fixed time, for example, the location information of the vehicle may be collected at a preset interval. The location information of the vehicle may be longitude and latitude information of the vehicle, and the location information of the vehicle collected each time may be considered as a track point. In a specific implementation, if the location information of the vehicle is collected at a fixed time, track points may be very dense. This is not conducive to later determining a heading of the vehicle based on the track points, and is represented by a waste of computing power and storage space. In this case, the track point may be recorded based on the traveling speed of the vehicle, for example, a standard speed and a frequency of collecting the track point corresponding to the standard speed are set. For example, the frequency of collecting the track point corresponding to the standard speed is a first frequency. When the traveling speed of the vehicle is greater than the standard speed, the frequency of collecting the track point is greater than the first frequency. When the traveling speed of the vehicle is less than the standard speed, the frequency of collecting the track point is less than the first frequency. In addition, another manner of determining the track point based on the speed may be used. The following uses an example for description. For example, track points may be obtained at a fixed time, and then some track points are deleted from the obtained track points based on the traveling speed of the vehicle. For example, if the traveling speed of the vehicle is 5 kilometers per hour (km/h), one track point is selected from every five points and other track points are discarded, or one track point is selected from every 5K points and other track points are discarded, where k is a positive integer. For example, when k is 1, 5k is 5, that is, one track point is selected from every five points, and other track points that are not selected are discarded, or when k is 2, 5k is 10, that is, one track point is selected for every 10 points, and other track points that are not selected are discarded.

Figure 3:
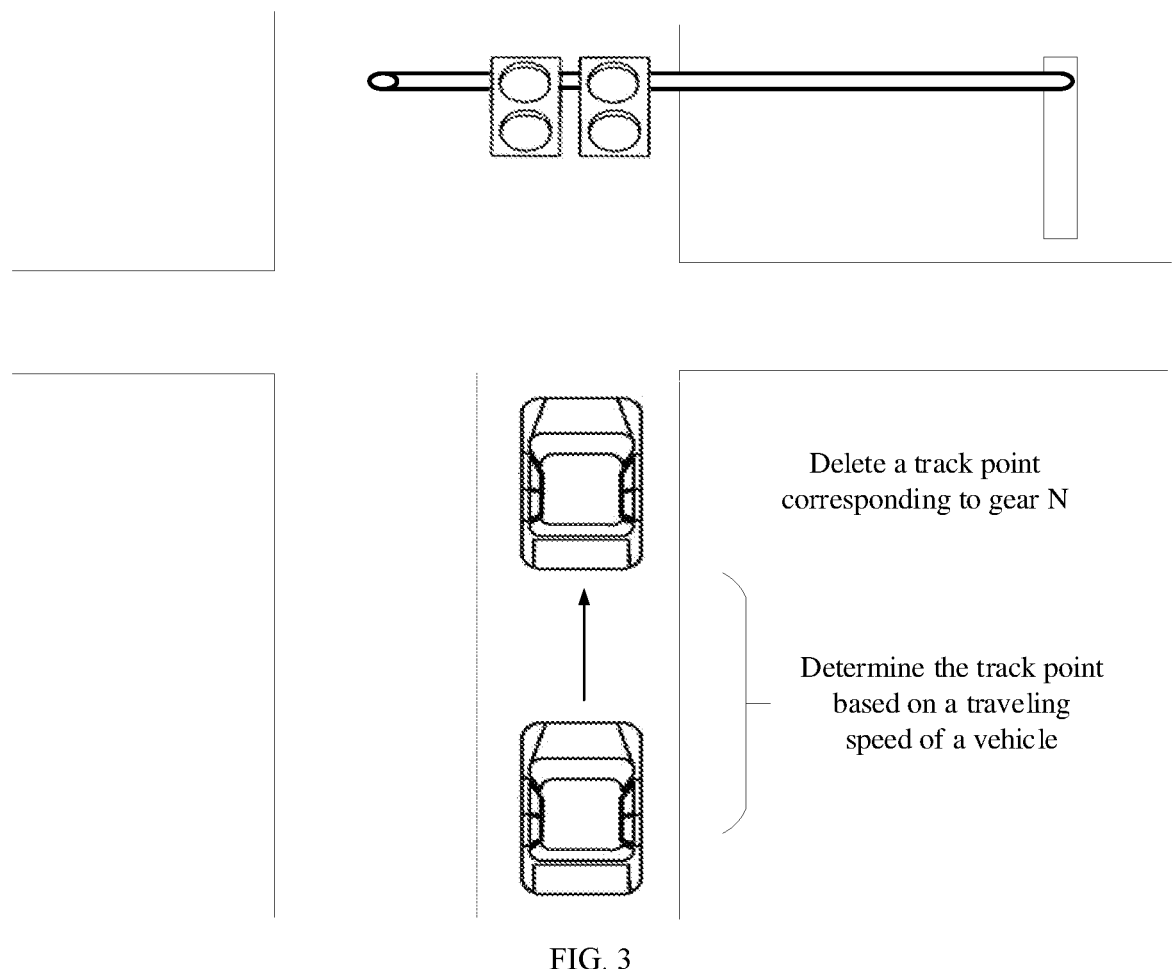
FIG. 3 is a schematic diagram of an application scenario of a solution according to this application.

The traveling track may also be obtained based on the change of the gear. The following uses an example for description. For example, a track point whose gear is N gear may be deleted from the track points. N gear is usually used during a temporary stop. For example, as shown in FIG. 3, the gear is shifted to N gear while the vehicle is waiting at a traffic light. When the vehicle is in N gear, a location of the vehicle usually remains unchanged. If a track point is collected in N gear, the track point corresponding to N gear may be deleted.

Figure 4:
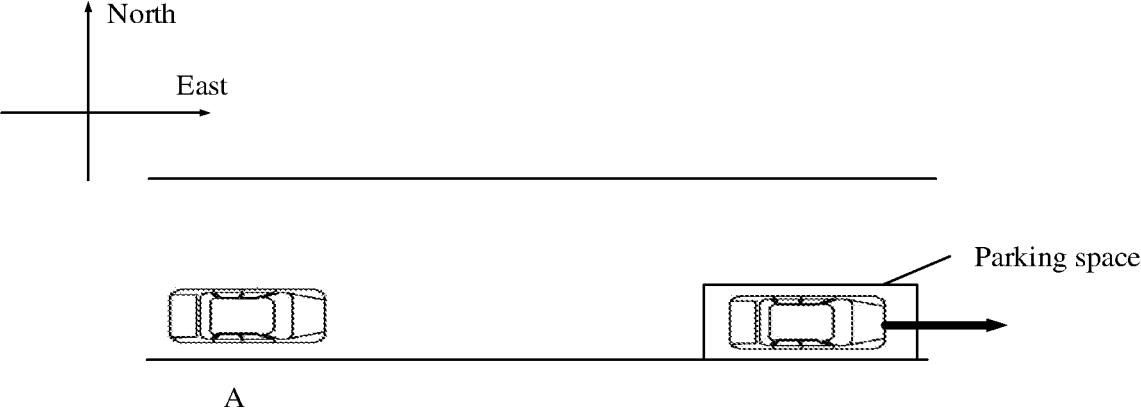
FIG. 4 is a schematic diagram of another application scenario of a solution according to this application.
Figure 5:
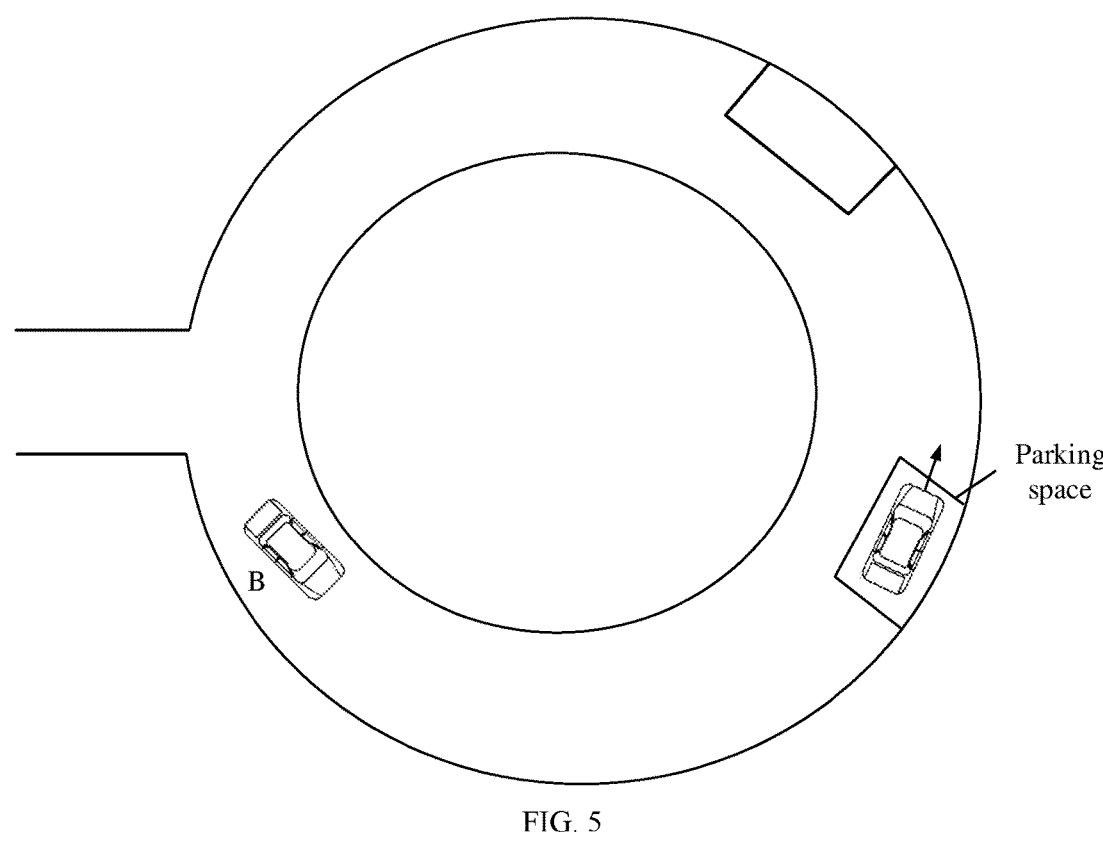
FIG. 5 is a schematic diagram of another application scenario of a solution according to this application.
Figure 6:
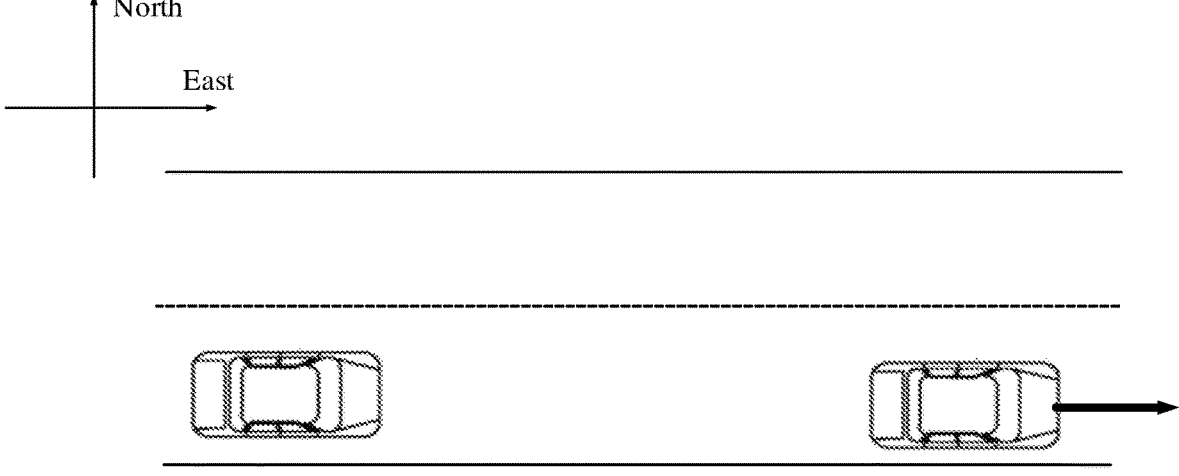
FIG. 6 is a schematic diagram of another application scenario of a solution according to this application.
Figure 7:
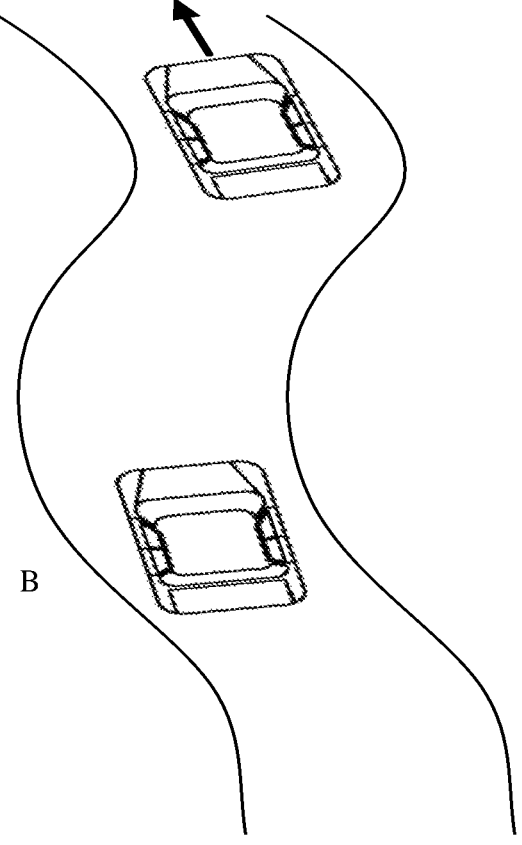
FIG. 7 is a schematic diagram of another application scenario of a solution according to this application.

Different driving scenarios need to be considered about how to determine the heading of the vehicle based on the traveling track, and the following is a specific description. The solution provided in this application may be applied to a plurality of driving scenarios. For example, two driving scenarios are used as an example to describe how to determine the heading of the vehicle based on the traveling track. The first scenario is a navigation scenario when the vehicle starts. This scenario is a scenario to which the technical solutions provided in this application are mainly applicable. This scenario is a scenario in which navigation is started when the vehicle is stationary, or a navigation scenario in which the vehicle is in a parked state. For example, a specific scenario may be that the vehicle starts navigation from a parking space. The second scenario is a navigation scenario in a driving process of the vehicle. In this scenario, the vehicle is driving on a road, and navigation is started in the driving process. For each of the first scenario and the second scenario, the scenario may further include that the traveling track of the vehicle is a straight line or the traveling track of the vehicle is a curve. It should be noted that the traveling track in this application is a last traveling track of the vehicle. In other words, the traveling track in this application may be a segment of track at a preset distance from a current location of the vehicle. For example, in the first scenario, if the preset distance is 20 meters, the last traveling track of the vehicle may refer to track points obtained within 20 meters before the vehicle parks. In addition, it should be noted that the traveling track may be some track points including location information. When a curvature change rate of the plurality of track points is not greater than a first preset value, it may be considered that the traveling track is a straight line, or if the curvature change rate of the plurality of track points is greater than the first preset value, it may be considered that the traveling track is a curve. To better understand a scenario to which the solutions provided in this application are applicable, the following provides descriptions with reference to FIG. 4 to FIG. 7. FIG. 4 is a schematic diagram of an application scenario of the solution according to this application. FIG. 4 is a schematic diagram of the first scenario. Assuming that the vehicle enters a parking space from a location A, it may be determined, based on the traveling track of the vehicle, that the heading of the vehicle is a direction indicated by an arrow in FIG. 4. Using a coordinate system shown in FIG. 4 as an example, the heading of the vehicle is east. FIG. 5 is another schematic diagram of the first scenario. Assuming that the vehicle enters a parking space from a location B, it may be determined, based on the traveling track of the vehicle, that the heading of the vehicle is a direction indicated by an arrow in FIG. 5. A difference between FIG. 4 and FIG. 5 lies in that, in the scenario shown in FIG. 4, the traveling track is a straight line, and in the scenario shown in FIG. 5, the traveling track is a curve. FIG. 6 is a schematic diagram of another application scenario of the solution according to this application. FIG. 6 is a schematic diagram of the second scenario. Assuming that the vehicle travels in a straight line on a road, it may be determined, based on the traveling track of the vehicle, that the heading of the vehicle is a direction indicated by an arrow in FIG. 6. Using a coordinate system shown in FIG. 6 as an example, the heading of the vehicle is east. FIG. 7 is another schematic diagram of the second scenario. Assuming that the vehicle is traveling on a curve, it may be determined, based on the traveling track of the vehicle, that the heading of the vehicle is a direction indicated by an arrow in FIG. 7. A difference between FIG. 6 and FIG. 7 lies in that, in the scenario shown in FIG. 6, the traveling track is a straight line, and in the scenario shown in FIG. 7, the traveling track is a curve. FIG. 4 and FIG. 5 show a navigation scenario when the vehicle starts, and FIG. 6 and FIG. 7 show a navigation scenario in a driving process of the vehicle.

In the solution provided in this application, a second navigation direction may be determined based on the first navigation direction and the heading of the vehicle. In an example, according to the solution provided in this application, in the first scenario, namely, the navigation scenario when the vehicle starts, deviation correction does not need to be performed until the vehicle travels for a specific distance and generates a track. According to the solution provided in this application, the heading of the vehicle may be used as a reference direction, to directly perform deviation correction on the first navigation direction. In the second scenario, namely, the navigation scenario in a driving process of the vehicle, a time required for deviation correction can be reduced, and navigation efficiency can be improved.

Figure 8:
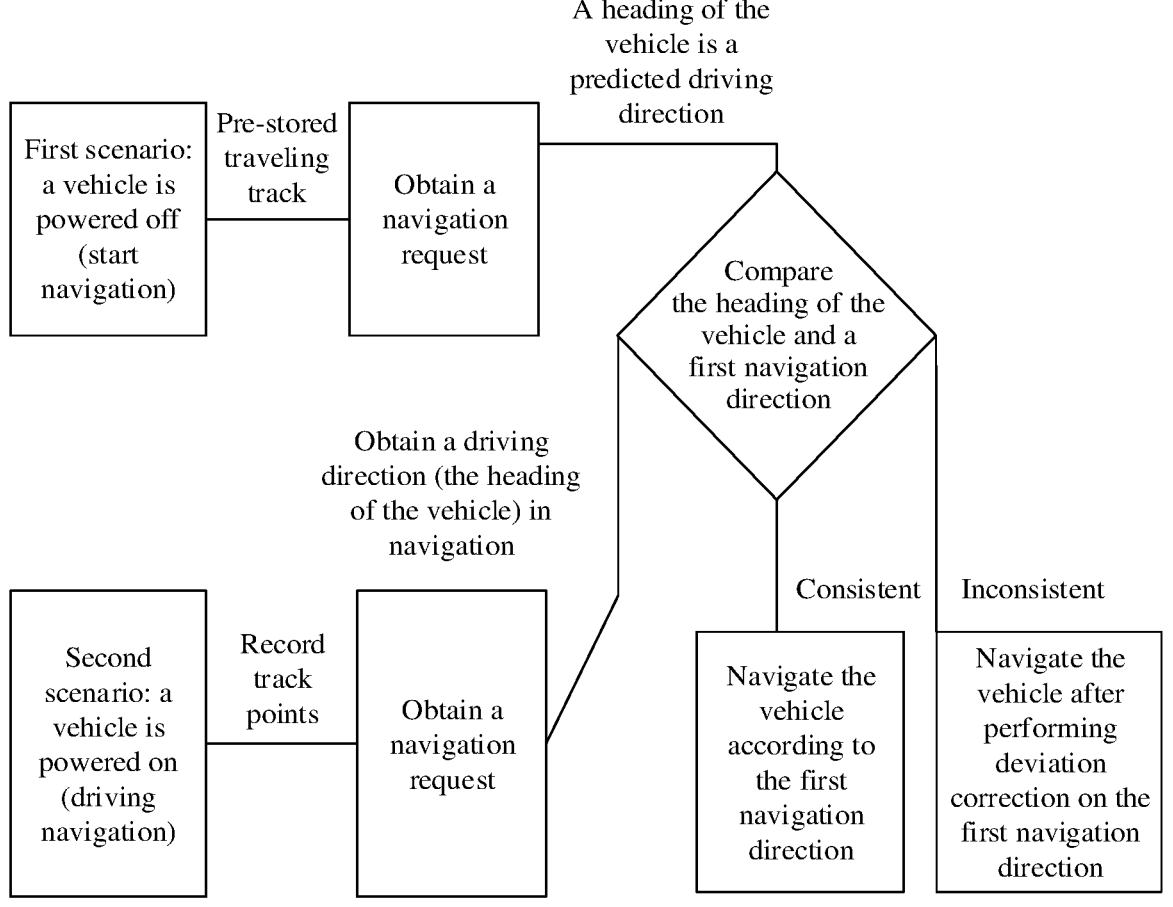
FIG. 8 is a schematic diagram of another application scenario of a solution according to this application.

FIG. 8 is a schematic flowchart of a navigation method according to an embodiment of this application. As shown in FIG. 8, the solution provided in this application is applicable to two different scenarios. In the first scenario, a vehicle is in a power-off state, for example, the vehicle is in a parked state, and in this case, a gear may be P gear. After a navigation request (the navigation request includes location information of a start place and location information of a destination) is obtained, a heading of the vehicle may be determined based on a pre-stored traveling track. Assuming that a navigation direction determined based on the location information of the start place and the location information of the destination is a first navigation direction, if the first navigation direction is consistent with the heading of the vehicle, the vehicle is navigated according to the first navigation direction, or if the first navigation direction is inconsistent with the heading of the vehicle, deviation correction is performed on the first navigation direction to obtain a second navigation direction, and the vehicle is navigated according to the second navigation direction. Whether the first navigation direction is consistent with the heading of the vehicle may be determined based on a relationship between a preset angle and an included angle between the first navigation direction and the heading of the vehicle. The following provides a description with reference to an embodiment corresponding to FIG. 9. In the second scenario, the vehicle is in a power-on state, for example, the vehicle is in a driving process. The vehicle may store a traveling track of the vehicle in the driving process, and may determine track points based on the traveling track. When the vehicle is in the power-on state, and after the navigation request is obtained, a driving direction may be considered as the heading of the vehicle, and an included angle between the driving direction and the first navigation direction is compared. If the first navigation direction is consistent with the heading of the vehicle, the vehicle is navigated according to the first navigation direction, or if the first navigation direction is inconsistent with the heading of the vehicle, deviation correction is performed on the first navigation direction to obtain the second navigation direction, and the vehicle is navigated according to the second navigation direction.

In addition, it should be noted that there may be different implementations of calculation timing of the heading of the vehicle. In one manner, the heading of the vehicle may be determined based on the traveling track after the navigation is started. In another manner, before the navigation is started, the heading of the vehicle may be determined in advance based on the traveling track, and the heading of the vehicle is stored. After the traveling track changes, a new heading of the vehicle is determined based on an updated traveling track, and an originally stored heading of the vehicle is updated. After navigation is started, the newly stored heading of the vehicle may be directly used for navigation.

The vehicle is navigated according to the second navigation direction, or a navigation guide is determined based on the second navigation direction. The navigation guide in this application may also be referred to as a navigation command or a navigation instruction, and is used to prompt a driver or a user of a driving direction of the vehicle. Assuming that the second navigation direction is turning around, the navigation guide is turning around. In an example, the navigation guide may be displayed to the user in a form of a picture or text. For example, the navigation guide may be displayed on a screen of in-vehicle navigation, or the navigation guide may be played in a form of a voice. It should be noted that a manner of prompting the user of the navigation guide is not limited in this embodiment of this application.

The technical solutions provided in this application are different from determining the navigation guide based on the first navigation direction in the conventional technology. In this application, the second navigation direction is determined based on the first navigation direction and the heading of the vehicle, and the navigation guide is determined based on the second navigation direction. This improves navigation accuracy and navigation efficiency.

It should be noted that, in a possible implementation, the vehicle may be directly navigated based on the location information of the start place, the location information of the destination, and the heading of the vehicle that are of the vehicle instead of first determining the first navigation direction based on the location information of the start place and the location information of the destination that are of the vehicle, then performing deviation correction on the first navigation direction based on the heading of the vehicle to determine the second navigation direction, and navigating the vehicle according to the second navigation direction. In this implementation, the first navigation direction does not need to be explicitly determined, and data determined based on the location information of the start place and the location information of the destination that are of the vehicle may be considered as a parameter, and the parameter may be invoked or used in a process of determining a final navigation direction.

When the embodiment corresponding to FIG. 2 describes determining the heading of the vehicle based on the traveling track, it is mentioned that the traveling track includes two different scenarios in which the last traveling track of the vehicle is a straight line or the last traveling track of the vehicle is a curve. For each different scenario, a manner of determining the heading of the vehicle based on the traveling track is different. Descriptions are separately provided in the following. In addition, the following further describes several specific manners of determining the second navigation direction based on the first navigation direction and the heading of the vehicle.

Figure 9:
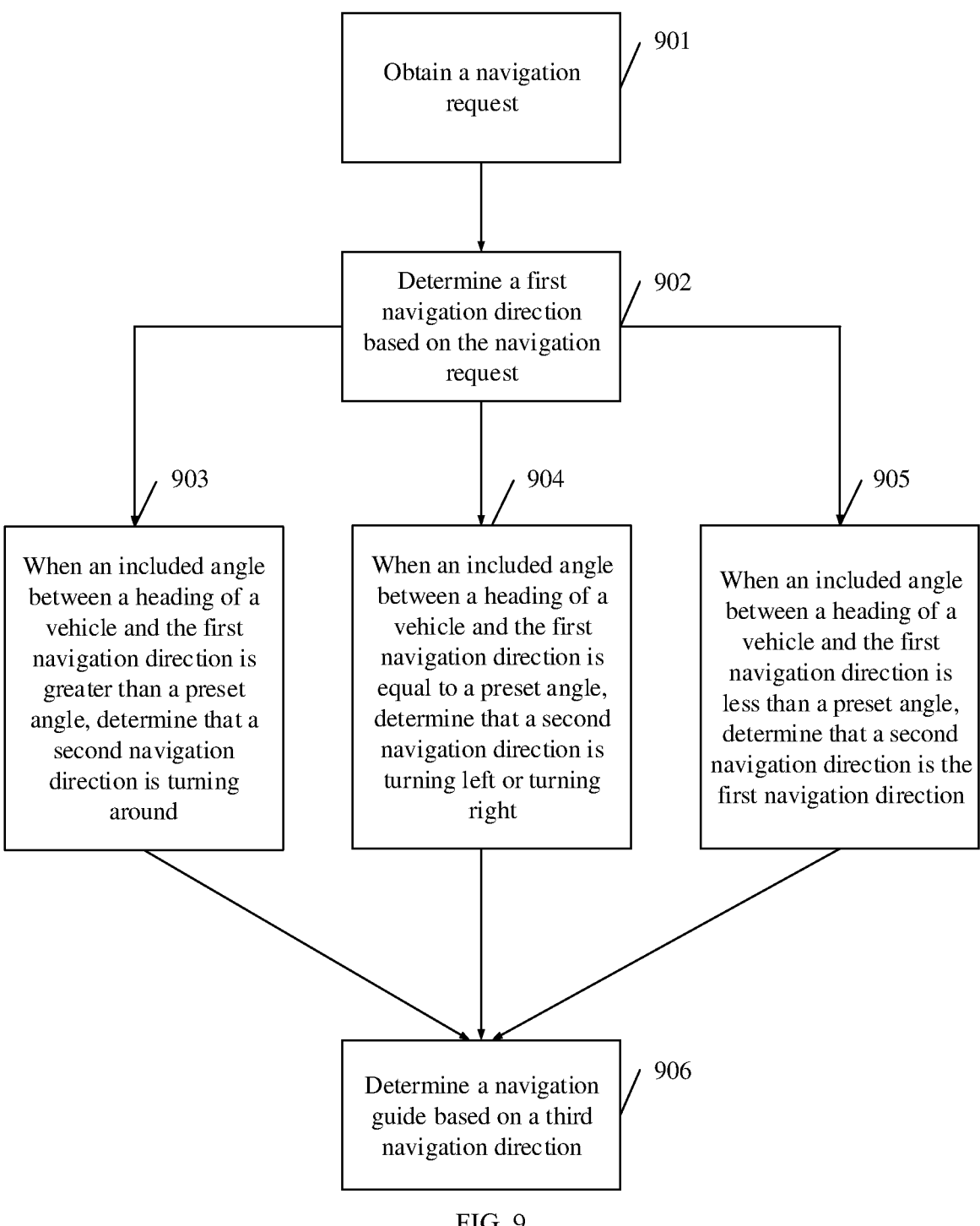
FIG. 9 is a schematic flowchart of another navigation method according to an embodiment of this application.

FIG. 9 is a schematic flowchart of another navigation method according to an embodiment of this application.

As shown in FIG. 9, the other navigation method according to this embodiment of this application may include the following steps:

901: Obtain a navigation request.

Step 901 may be understood with reference to step 201 in the embodiment corresponding to FIG. 2. Details are not described herein again.

902: Determine a first navigation direction based on the navigation request.

For how to determine the first navigation direction in step 902, refer to the description about determining the first navigation direction in step 202 in the embodiment corresponding to FIG. 2. Details are not described herein again.

903: When an included angle between a heading of the vehicle and the first navigation direction is greater than a preset angle, determine that a second navigation direction is turning around.

Figure 10A:
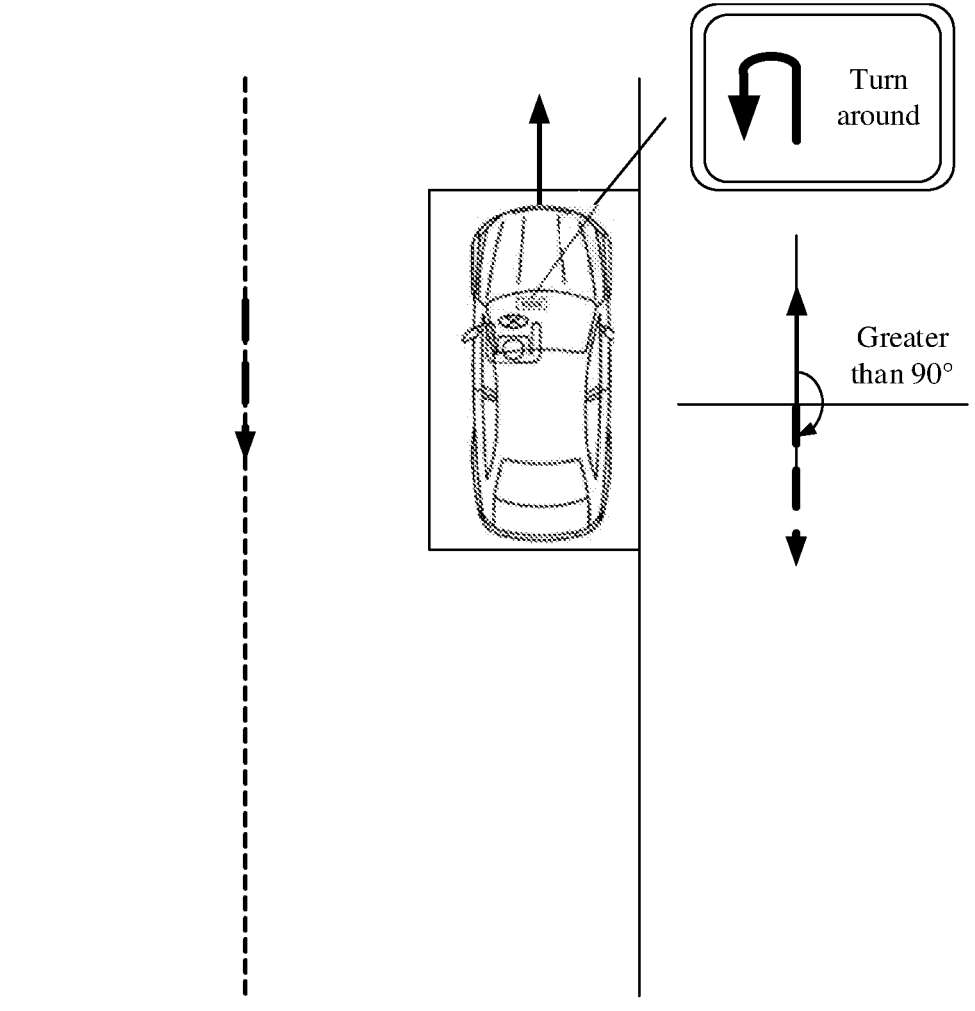
FIG. 10A is a schematic diagram of another application scenario of a solution according to this application.
Figure 10B:
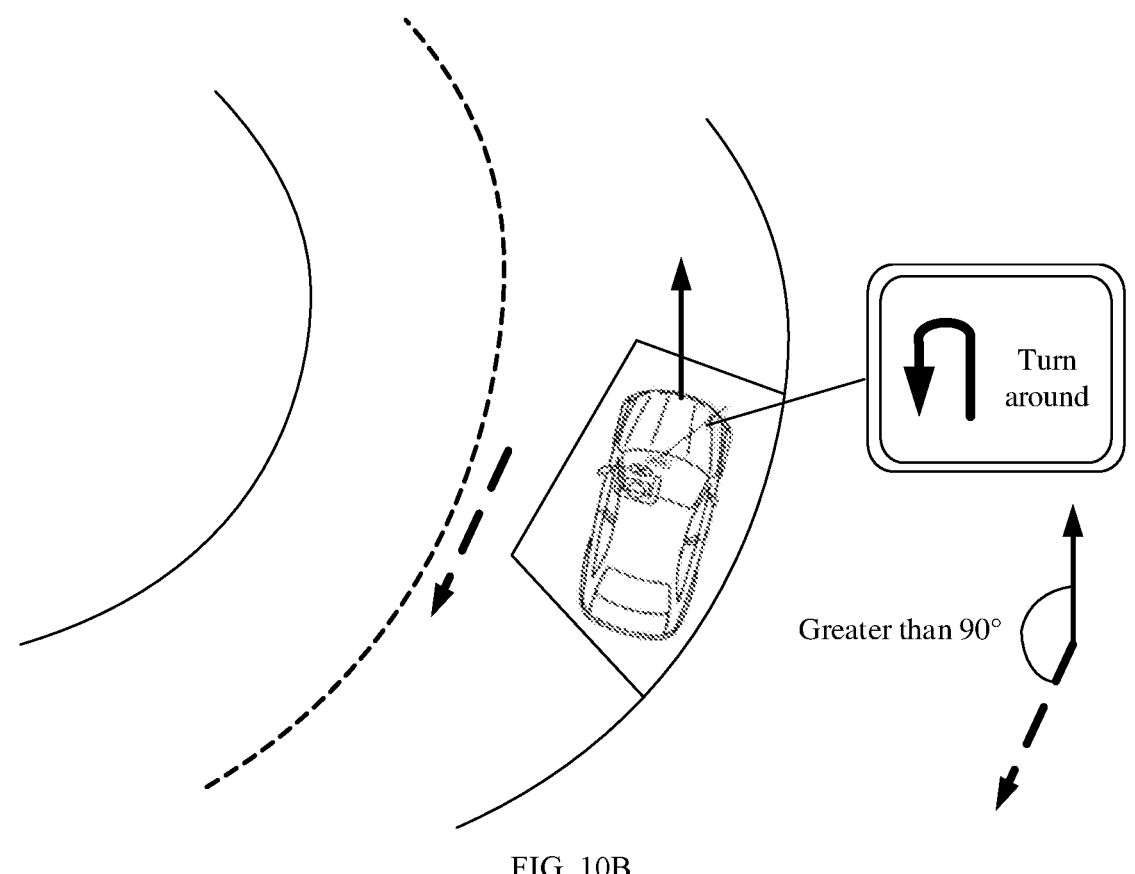
FIG. 10B is a schematic diagram of another application scenario of a solution according to this application.
Figure 10C:
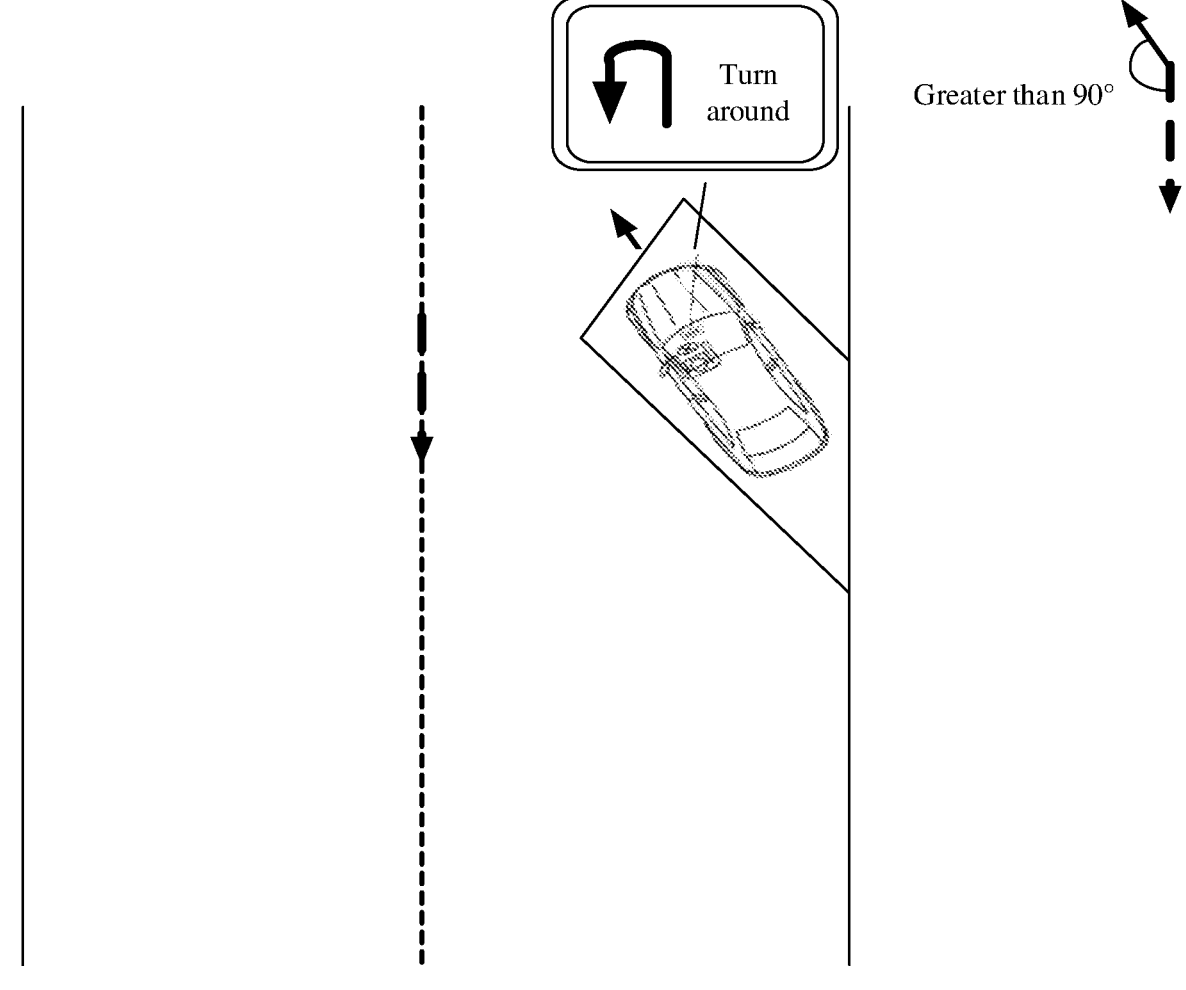
FIG. 10C is a schematic diagram of another application scenario of a solution according to this application.

The following uses start navigation as an example to describe the determining that a second navigation direction is turning around when an included angle between a heading of the vehicle and the first navigation direction is greater than a preset angle. It should be noted that the included angle between the heading of the vehicle and the first navigation direction may be a positive angle or a negative angle, and the corresponding preset angle may be a positive number or a negative number. For example, a vector in which the heading of the vehicle is located is considered as one side of the included angle, a vector in which the first navigation direction is located is considered as another side of the included angle, and if the included angle between the heading of the vehicle and the first navigation direction is considered as a positive angle, that is, an angle generated by rotating a vertex of one edge in a counterclockwise direction of the other edge is a positive angle, for example, A degree (°), or if the included angle between the heading of the vehicle and the first navigation direction is considered as a negative angle, that is, an angle generated by rotating a vertex of one edge in a clockwise direction of the other edge is a negative angle, for example, −(360°−A°)°. In a possible implementation, when the included angle between the heading of the vehicle and the first navigation direction is greater than an absolute value of the preset angle, it is determined that the second navigation direction is turning around. For example, the preset angle may be a positive angle or a negative angle. The second navigation direction may be determined by comparing the absolute value of the preset angle with the included angle. The included angle is the included angle between the heading of the vehicle and the first navigation direction. It should be noted that, navigation in a driving process may be understood with reference to the start navigation, and details are not described herein again. FIG. 10A is a schematic diagram of another application scenario of the solution according to this application. It is assumed that the vehicle is parked in a parallel parking space, and the parallel parking space is generally applicable to a scenario in which the vehicle is parked on a road side. It is assumed that a solid-line arrow is the heading of the vehicle determined based on the traveling track, a dashed-line arrow is the first navigation direction determined based on a navigation track, and the preset angle is 90°. If the included angle between the heading of the vehicle and the first navigation direction is greater than 90°, it is determined that the second navigation direction is turning around. FIG. 10B is a schematic diagram of another application scenario of the solution according to this application, and is also a scenario in which the included angle between the heading of the vehicle and the first navigation direction is greater than the preset angle. It is determined that the second navigation direction is turning around. FIG. 10C is a schematic diagram of another application scenario of the solution according to this application. It is assumed that the vehicle is parked in an angle parking space, and the angle parking space is generally applicable to an indoor and outdoor parking lot scenario. Assuming that a solid-line arrow is the heading of the vehicle determined based on the traveling track, and a dashed-line arrow is the first navigation direction determined based on the navigation track, the preset angle is 90°, and the included angle between the heading of the vehicle and the first navigation direction is greater than 90°, it is determined that the second navigation direction is turning around.

When there is a large deviation between a navigation calculated direction and an actual heading of the vehicle, the navigation performs correction. In this way, the vehicle can depart from the parking space and travel according to a corrected direction instruction, avoiding taking a wrong road. According to the solution provided in this application, before displaying the navigation guide to the vehicle, a navigation system checks an angle deviation between the heading of the vehicle and the first navigation direction. If the included angle between the heading of the vehicle and the first navigation direction is greater than the preset angle, a navigation guide after deviation correction is performed is displayed. In a possible implementation, the navigation guide is displayed to a user.

904: When an included angle between a heading of the vehicle and the first navigation direction is equal to a preset angle, determine that a second navigation direction is turning left or turning right.

Figure 11A:
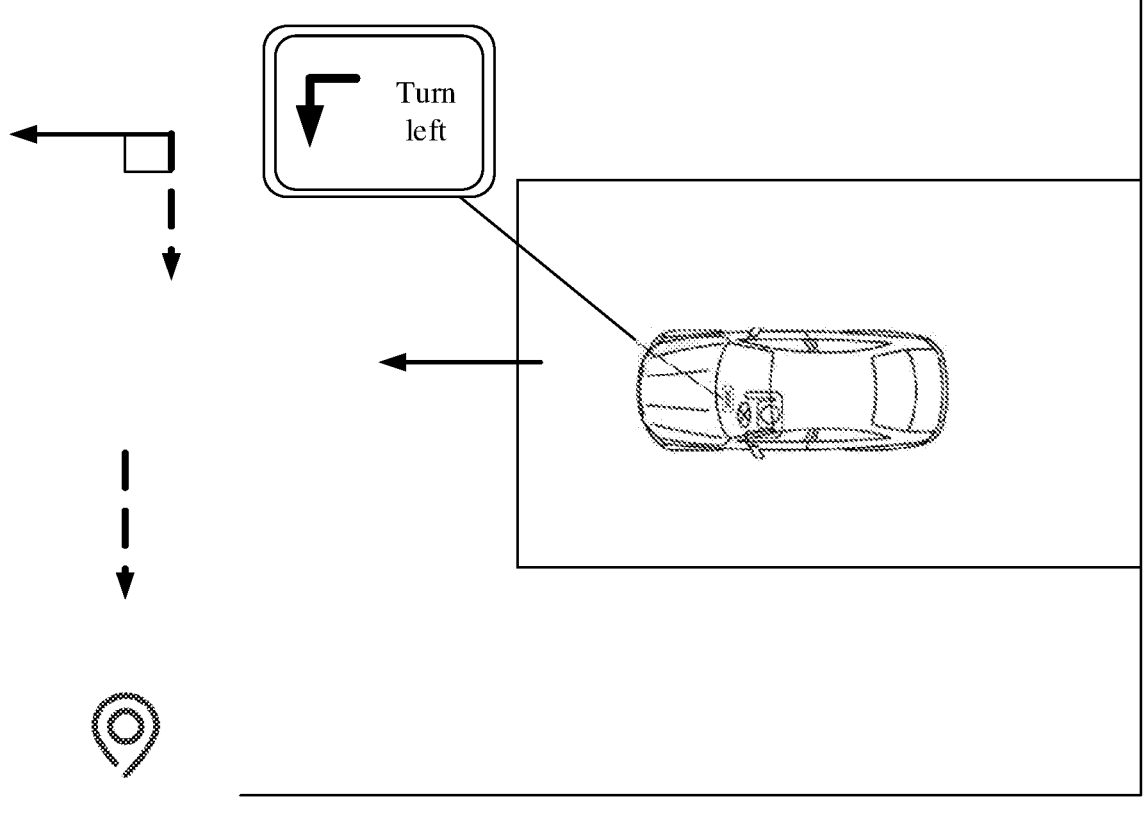
FIG. 11A is a schematic flowchart of another navigation method according to an embodiment of this application.
Figure 11B:
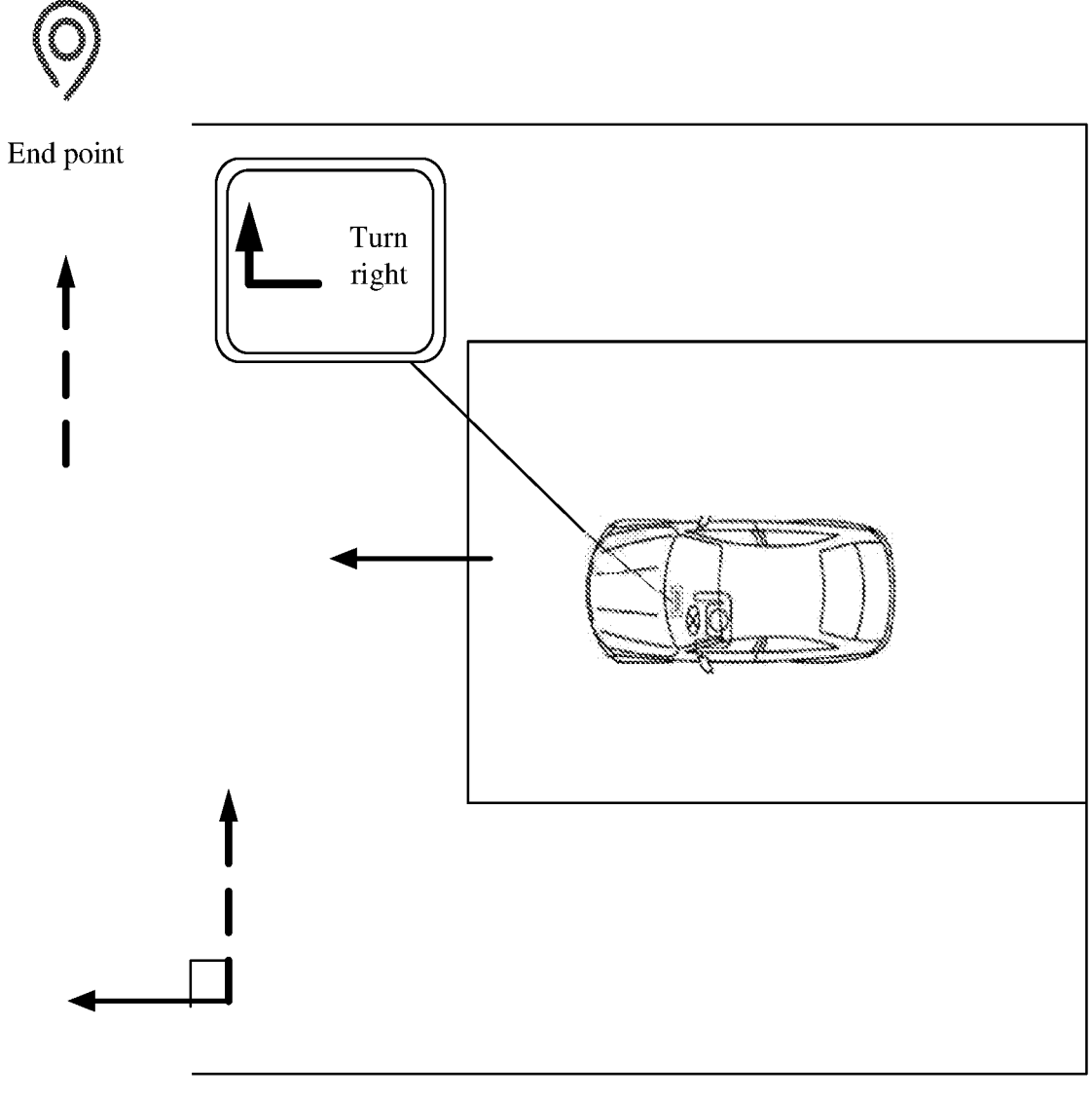
FIG. 11B is a schematic diagram of another application scenario of a solution according to this application.

FIG. 11A and FIG. 11B are separately a schematic diagram of another application scenario according to an embodiment of this application. It is assumed that a solid-line arrow is the heading of the vehicle determined based on the traveling track, a dashed-line arrow is the first navigation direction determined based on the navigation track, and the preset angle is 90°. If the included angle between the heading of the vehicle and the first navigation direction is equal to 90°, it is determined that the second navigation direction is turning left or turning right. A scenario to which this manner is applicable may be a scenario in which the parking space is a perpendicular parking space. In this case, the heading of the vehicle is a driving direction, and a prompt is turning left or turning right. After the user parks in the perpendicular parking space, and sets a navigation start, as shown in FIG. 11A, it is determined to turn left based on the first navigation direction determined by navigation. Alternatively, as shown in FIG. 11B, it is determined to turn right based on the first navigation direction determined by navigation. In this case, it may be directly selected to turn left or turn right according to a corrected navigation instruction.

905: When an included angle between a heading of the vehicle and the first navigation direction is less than a preset angle, determine that a second navigation direction is the first navigation direction.

Figure 12:
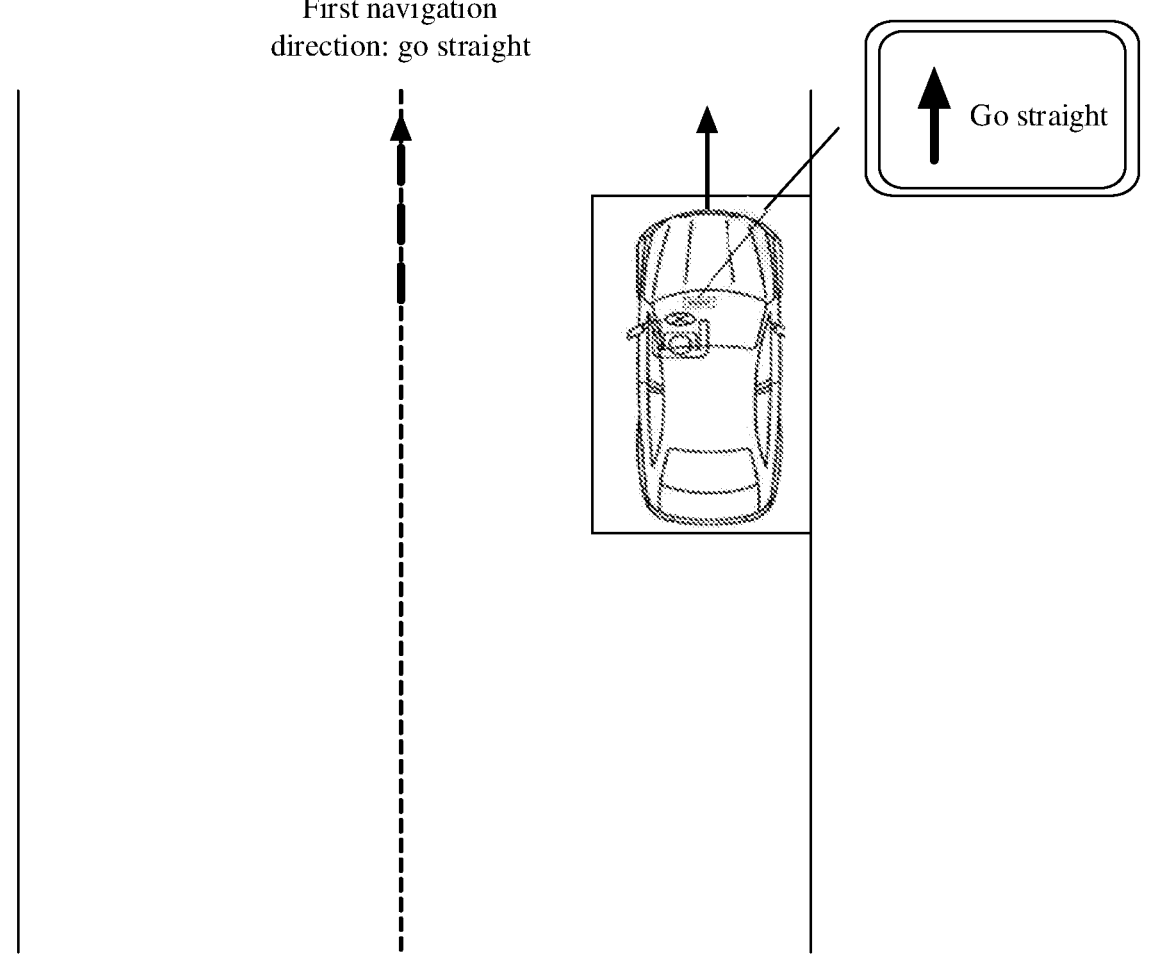
FIG. 12 is a schematic diagram of another application scenario of a solution according to this application.

FIG. 12 is a schematic diagram of another application scenario according to an embodiment of this application. It is assumed that a solid-line arrow is the heading of the vehicle determined based on the traveling track, a dashed-line arrow is the first navigation direction determined based on the navigation track, and the preset angle is 90°. If the included angle between the heading of the vehicle and the first navigation direction is less than 90°, it is determined that the second navigation direction is the first navigation direction. In this scenario, when the included angle between the heading of the vehicle and the first navigation direction is less than the preset angle, deviation correction does not need to be performed on the first navigation direction, and the navigation guide may be directly determined based on the first navigation direction, that is, the second navigation direction is the first navigation direction.

Steps 903 to 905 in the embodiment corresponding to FIG. 9 may be considered as detailed descriptions of step 203 in the embodiment corresponding to FIG. 2.

906: Determine the navigation guide based on the second navigation direction.

Step 906 may be understood with reference to step 204 in the embodiment corresponding to FIG. 2. Details are not described herein again.

It can be learned from the embodiment corresponding to FIG. 9 that, compared with that the traveling track is currently needed to correct the navigation guide direction, the solution provided in this application can complete correction of the navigation instruction direction on a premise of being stationary.

The traveling track includes two different scenarios in which the last traveling track of the vehicle is a straight line or the last traveling track of the vehicle is a curve. For each different scenario, a manner of determining the heading of the vehicle based on the traveling track is different. Descriptions are separately provided in the following.

In most embodiments of this application, the solution is described provided that the preset angle is 90°. It should be noted that, in some other possible implementations, the preset angle may alternatively be another value. For example, the preset angle may alternatively be 92°, 87°, or the like. It should be understood that a purpose of setting the preset angle in this application is to determine a deviation between the heading of the vehicle and the first navigation direction. If the heading of the vehicle is close to the first navigation direction, the vehicle may be prompted to travel in the first navigation direction. If the heading of the vehicle is not close to the first navigation direction, for example, the heading of the vehicle is opposite to the first navigation direction, the vehicle may be prompted to turn around. If the heading of the vehicle is nearly perpendicular to the first navigation direction, the vehicle needs to be prompted to turn left or turn right. In some possible implementations, different angle ranges may be specified. For example, three preset angle ranges may be specified, which are respectively a first preset range, a second preset range, and a third preset range. When the included angle falls within the first preset range, it may be considered that the first navigation direction is not close to the heading of the vehicle, and the solution may be executed according to step 903, to determine that the second navigation direction is turning around. When the included angle falls within the second preset range, it may be considered that the first navigation direction is nearly perpendicular to the heading of the vehicle, and the solution may be executed according to step 904. When the included angle falls within the third preset range, it may be considered that the first navigation direction is very close to the heading of the vehicle, and the solution may be executed according to step 905, to determine that the second navigation direction is the first navigation direction. The following uses an example for description. It is assumed that the second preset range is greater than 85° and not greater than 90°, the first preset range may be greater than 90° and not greater than 180°, and the third preset range may be not less than 0° and not greater than 85°.

In addition, it should be noted that the first preset range, the second preset range, and the third preset range do not overlap each other, so as to avoid a problem that the included angle between the heading of the vehicle and the first navigation direction falls within two preset ranges at the same time, and the second navigation direction is unclear. In addition, it should be noted that a sum of the first preset range, the second preset range, and the third preset range may cover all possible included angles between the heading of the vehicle and the first navigation direction. Alternatively, a sum of the first preset range, the second preset range, and the third preset range may not cover all possible included angles between the heading of the vehicle and the first navigation direction. When the included angle does not fall within any preset range of the three preset ranges, navigation is planned for the vehicle according to the first navigation direction.

In a possible implementation, two preset ranges may be set. For example, the first preset range and the second preset range may be set, the first preset range and the third preset range may be set, or the second preset range and the third preset range may be set. When only two preset ranges are set, neither of the two preset ranges overlap, so as to avoid a problem that the included angle between the heading of the vehicle and the first navigation direction falls within two preset ranges at the same time, and the second navigation direction is unclear. In addition, it should be noted that when two preset ranges are set, a sum of the two ranges does not need to cover all possible included angles between the heading of the vehicle and the first navigation direction. For example, only the first preset range and the second preset range are set. When the included angle falls within the first preset range, it may be considered that the first navigation direction is not close to the heading of the vehicle, and the solution may be executed according to step 903, to determine that the second navigation direction is turning around. When the included angle falls within the second preset range, it may be considered that the first navigation direction is nearly perpendicular to the heading of the vehicle, and the solution may be executed according to step 904. When the included angle falls neither within the first preset range nor within the second preset range, navigation is planned for the vehicle according to the first navigation direction, to be specific, navigation is planned for the vehicle based on the start place and the destination. In a possible implementation, only one preset range may be set. For example, only the first preset range may be set, or only the second preset range may be set. When only one preset range is set, when the included angle between the heading of the vehicle and the first navigation direction falls within the set preset range, the solution provided in this application is performed. If the included angle does not fall within the set preset range, navigation is planned for the vehicle according to the first navigation direction, to be specific, navigation is planned for the vehicle based on the start place and the destination. For example, when only one preset range is set, and the preset range is the first preset range, if the included angle falls within the first preset range, it may be considered that the first navigation direction is not close to the heading of the vehicle, and the solution may be executed according to step 903, to determine that the second navigation direction is turning around. When the included angle does not fall within the first preset range, navigation is planned for the vehicle according to the first navigation direction, or the navigation guide is determined based on the first navigation direction. Alternatively, when only one preset range is set, and the preset range is the second preset range, if the included angle falls within the second preset range, it may be considered that the first navigation direction is nearly perpendicular to the heading of the vehicle, and the solution may be executed according to step 904. When the included angle does not fall within the second preset range, navigation is planned for the vehicle according to the first navigation direction, or the navigation guide is determined based on the first navigation direction. Alternatively, when only one preset range is set, and the preset range is the third preset range, if the included angle falls within the third preset range, it may be considered that the first navigation direction is very close to the heading of the vehicle, and the solution may be executed according to step 905, to determine that the second navigation direction is the first navigation direction. When the included angle does not fall within the third preset range, it may be considered that the first navigation direction is not very close to the heading of the vehicle, and the user may be prompted to turn around, or the user may be prompted to turn left or turn right.

Figure 13:
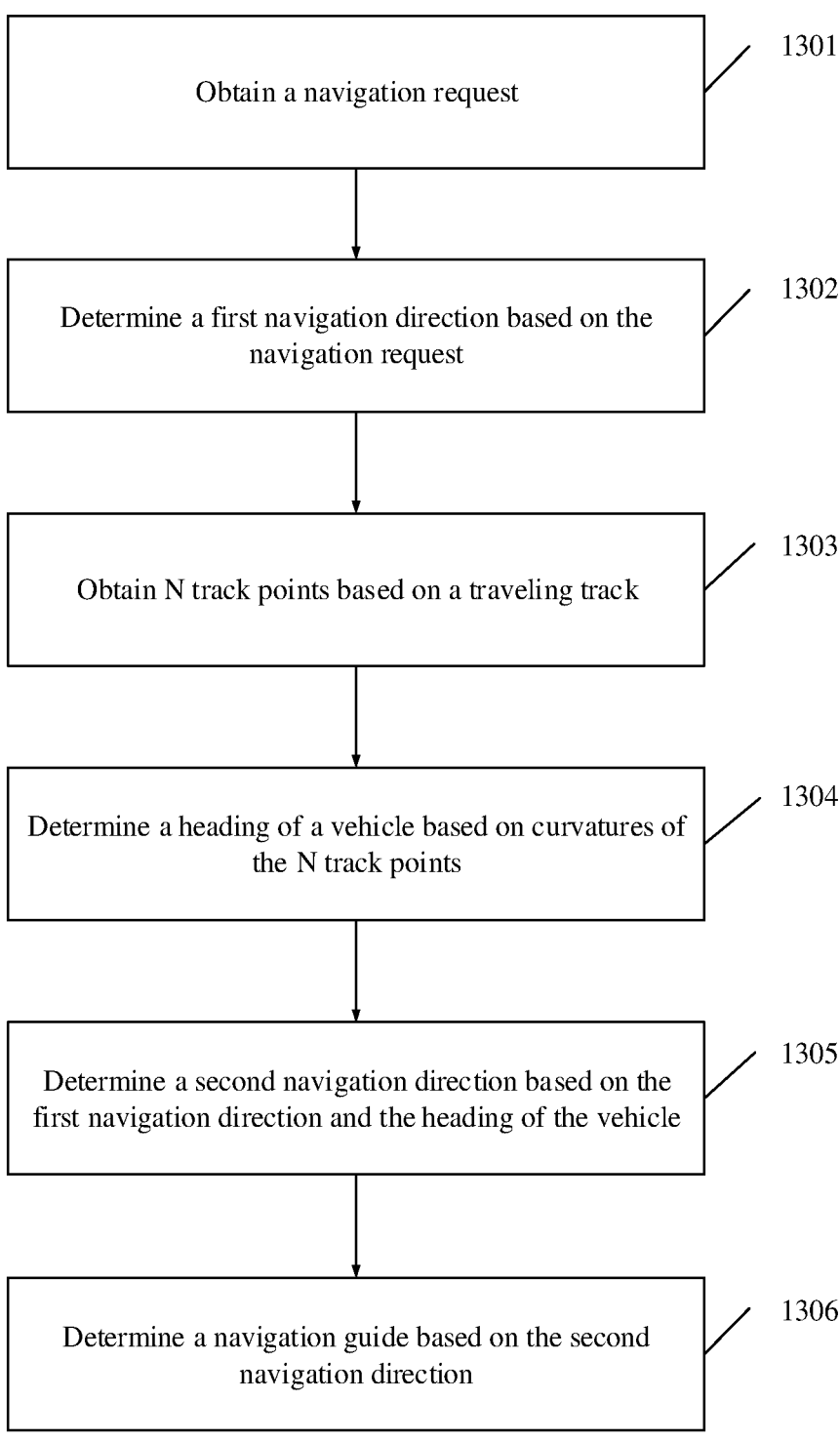
FIG. 13 is a schematic flowchart of another navigation method according to an embodiment of this application.

FIG. 13 is a schematic flowchart of another navigation method according to an embodiment of this application.

As shown in FIG. 13, another navigation method according to this embodiment of this application may include the following steps.

1301: Obtain a navigation request.

Step 1301 may be understood with reference to step 201 in the embodiment corresponding to FIG. 2. Details are not described herein again.

1302: Determine a first navigation direction based on the navigation request.

For how to determine the first navigation direction in step 1302, refer to the description about determining the first navigation direction in step 202 in the embodiment corresponding to FIG. 2. Details are not described herein again.

1303: Obtain N track points based on a traveling track.

The traveling track is a segment of traveling track that is at a preset distance from a current location of a vehicle. For example, in a driving start navigation scenario, assuming that the preset distance is 20 meters, the traveling track is a traveling track of 20 meters before the vehicle parks.

A plurality of track points is determined based on the traveling track. M track points in the plurality of track points are deleted based on a preset condition, to obtain the N track points. The preset condition includes one or more of a first preset condition and a second preset condition, the first preset condition is that curvatures of the M track points are greater than a second preset value, and the second preset condition is that a vehicle gear corresponding to the M track points is a neutral gear. After an approximate curvature of a track point is calculated, whether the track point is an invalid point is determined based on whether an absolute value of the approximate curvature of the track point is greater than the second preset value. If the absolute value of the approximate curvature is greater than the second preset value, the track point is an invalid point. After the invalid point is determined, the track point determined as the invalid point is deleted from the track point set, to form a new track point set. A track point whose gear is N gear may further be deleted from the track points. N gear is usually used during a temporary stop. When the vehicle is in N gear, a location of the vehicle usually remains unchanged. If a track point is collected in N gear, the track point corresponding to N gear may be deleted, to form a new track point set. It should be noted that there may be a plurality of preset conditions, and deletion processing may be separately performed on the plurality of track points based on each preset condition, to obtain the N track points, or deletion processing may be simultaneously performed on the plurality of track points based on the plurality of preset conditions, to obtain the N track points. Some track points are deleted from the plurality of track points based on the preset condition, to obtain the N track points, so as to reduce a computing time.

1304: Determine a heading of the vehicle based on curvatures of the N track points.

In this application, a curvature may be understood as a turning radius of the vehicle.

When a curvature change rate of the N track points is not greater than a first preset value, the heading of the vehicle is determined based on location information of any two track points in the N track points.

When the curvature change rate of the N track points is greater than the first preset value, the heading of the vehicle is determined based on the curvature change rate of the N track points and a vehicle speed.

First, a curvature of each of the N track points is calculated. After approximate curvatures of the N track points are calculated, it is determined whether the curvatures of the N track points are all less than a preset threshold, in other words, whether transformation rates of the curvatures of the N track points are less than the first preset value. If the curvatures of the N track points are all less than the threshold, or the transformation rates of the curvatures of the N track points are less than the first preset value, it is determined that the N track points are located on an approximately straight road section, and it may be considered that the N track points are on a straight line, that is, the traveling track is a straight line. If the transformation rates of the curvatures of the N track points are not less than the first preset value, it is considered that the N track points are not located on an approximately straight road section, that is, the traveling track is a curve. For a manner of determining a curvature of a track point, it may be determined, based on location information of two track points, that a curvature of each track point is equal to a value of an included angle between two vector line segments formed between the track point and front and back adjacent track points divided by a length of a vector line segment formed between the track point and the previous track point. It should be noted that curvatures of the start track point and the end track point of the N track points are not calculated.

Figure 14:
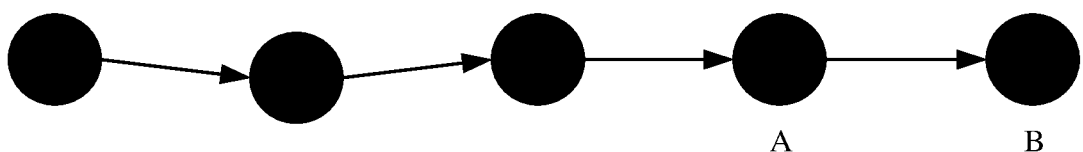
FIG. 14 is a schematic diagram of another application scenario of a solution according to this application.

When it is determined that the traveling track is a straight line, the heading of the vehicle may be determined based on location information of any two track points in the N track points. For example, FIG. 14 is a schematic diagram of another application scenario according to an embodiment of this application. It is assumed that N is 5. Location information of the last point B and the second-to-last point A in the five track points is selected to determine the heading of the vehicle, and a direction of the last point B relative to the second-to-last point A is the heading of the vehicle. For how to determine a direction of one track point relative to another track point when location information of two track points is known, for example, the location information may be longitude and latitude information, the following provides a calculation method as an example. It is assumed that $Aj$ represents a longitude of point A, $Aw$ represents a latitude of point A, $Bj$ represents a longitude of point B, and $Bw$ represents a latitude of point B. It is assumed that an azimuth of the track point B relative to the track point A needs to be determined, the azimuth of the track point B relative to the track point A is determined by using the following formulas:

$$\cos(c)=\cos(90°-Bw)\times\cos(90°-Aw)+\sin(90°-Bw)\times\sin(90°-Aw)\times\cos(Bj-Aj)$$

where c represents an included angle formed by lines connecting A, B and the center of the earth; and $$\sin(A) = \sin\left(\frac{\sin(90° - Bw)\times\sin(Bj - Aj)}{\sin(c)}\right).$$

An arc sine function is used to calculate the angle, and the above formula can be directly written as:

$$A = \arcsin\left(\frac{\sin(90° - Bw)\times\sin(Bj - Aj)}{\sin(c)}\right).$$

Azimuth represents the azimuth, starting at 0 degrees from true north and rotating 360 degrees clockwise from east to south to west. According to the location of B relative to A on four quadrants and two axes, different processing are performed on calculation results based on different situations. It is assumed that point A is fixed to the origin, and if point B is in the first quadrant, Azimuth=A; if point B is in the second quadrant, Azimuth=360°+A; or if point B is in the fourth quadrant, Azimuth=180°−A.

Figure 15:
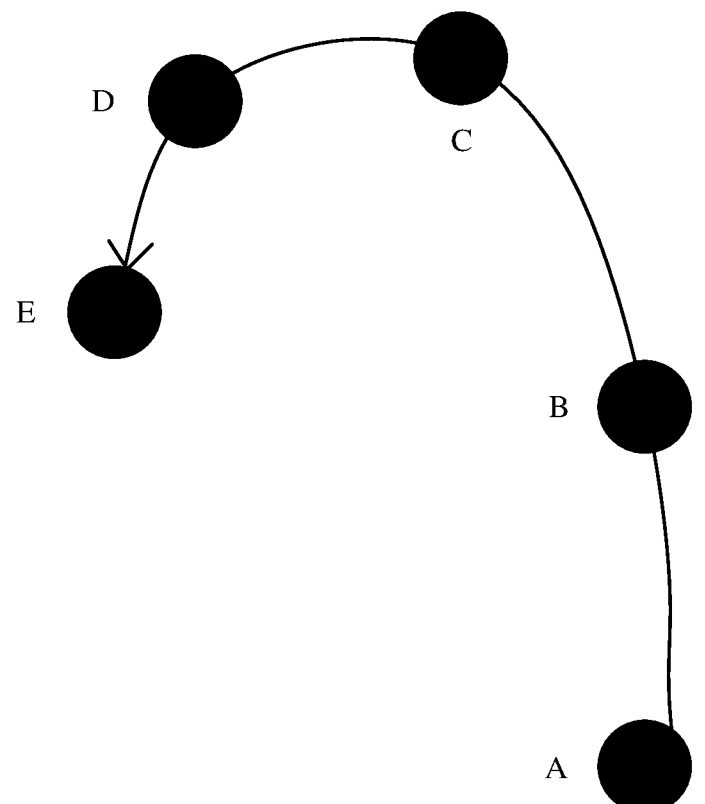
FIG. 15 is a schematic diagram of another application scenario of a solution according to this application.

When it is determined that the traveling track is a curve, the heading of the vehicle may be determined based on the curvature change rate of the N track points and the vehicle speed. For example, FIG. 15 is a schematic diagram of another application scenario according to an embodiment of this application. Assuming that N is 5, a curvature change rate of the five points is determined. A manner of calculating a curvature change rate based on curvatures in the conventional technology may be used in this embodiment of this application. A direction of a curvature at any point of the three points B, C, and D is used as a reference direction, and a direction of point E may be determined based on a curvature change rate and the vehicle speed. The direction of point E is the heading of the vehicle.

1305: Determined a second navigation direction based on the first navigation direction and the heading of the vehicle.

Step 1305 may be understood with reference to step 203 in the embodiment corresponding to FIG. 2 and step 903 to step 905 in the embodiment corresponding to FIG. 9. Details are not described herein again.

1306: Determine a navigation guide based on the second navigation direction.

Step 1306 may be understood with reference to step 204 in the embodiment corresponding to FIG. 2. Details are not described herein again.

The embodiment shown in FIG. 13 describes how to determine the heading of the vehicle based on the traveling track. It should be noted that, in some scenarios, determining the heading of the vehicle only based on the traveling track may not be accurate. To obtain a more accurate heading of the vehicle, the heading of the vehicle may be further determined with reference to steering wheel angle information. The following describes an embodiment of determining a heading of the vehicle with reference to steering wheel angle information.

Figure 16:
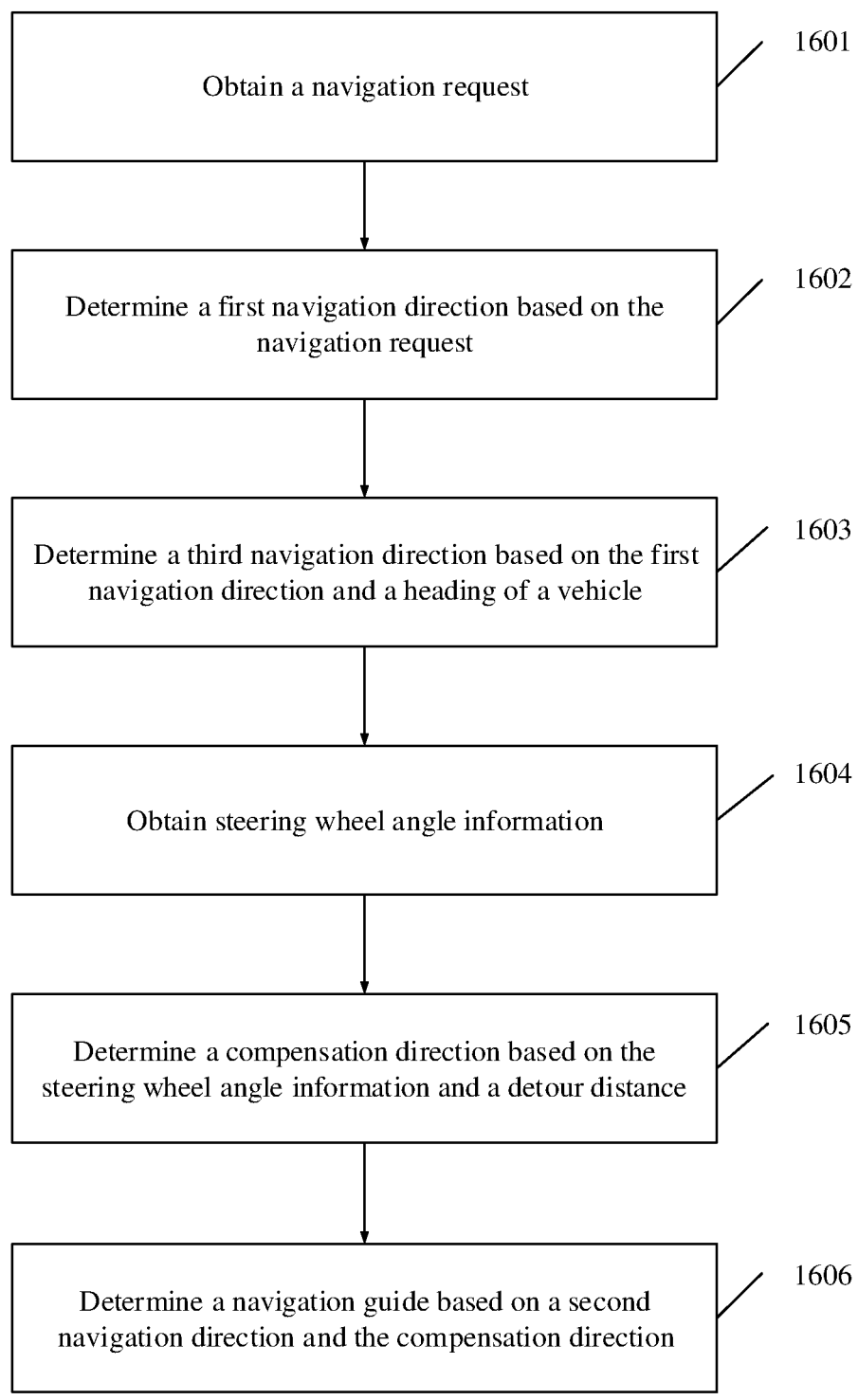
FIG. 16 is a schematic flowchart of another navigation method according to an embodiment of this application.

FIG. 16 is a schematic flowchart of another navigation method according to an embodiment of this application.

As shown in FIG. 16, another navigation method according to this embodiment of this application may include the following steps.

1601: Obtain a navigation request.

Step 1601 may be understood with reference to step 201 in the embodiment corresponding to FIG. 2. Details are not described herein again.

1602: Determine a first navigation direction based on the navigation request.

For how to determine the first navigation direction in step 1602, refer to the description about determining the first navigation direction in step 202 in the embodiment corresponding to FIG. 2. Details are not described herein again.

1603: Determined a third navigation direction based on the first navigation direction and a heading of the vehicle.

For understanding, refer to step 903 to step 905 in the embodiment corresponding to FIG. 9. Details are not described herein again. For determining the heading of the vehicle, refer to step 1303 and step 1304 in the embodiment corresponding to FIG. 13. Details are not described herein again.

1604: Obtain steering wheel angle information.

The steering wheel angle information is obtained when it is detected that a vehicle speed is less than a third preset value.

Assuming that track points change in a small range during parking, a direction may not be accurately predicted based on a traveling track determined by a GPS. Therefore, in this embodiment of this application, when the vehicle speed is less than the third preset value, for example, less than 5 km/h, an included steering wheel angle β of the vehicle, duration of the included angle, and a traveling speed of the vehicle start to be recorded. The duration of the included angle may be understood as a time at which the vehicle speed is a value obtained when the steering wheel angle information starts to be obtained to a time at which the vehicle speed is 0. The time at which the vehicle speed is 0 may also be understood as a time at which the vehicle is parked or a time at which the vehicle is in gear P.

A steering wheel angle of the vehicle can be obtained by using a sensor system. Generally, there is a correspondence between a heading angle of the vehicle and the steering wheel angle of the vehicle. Alternatively, the corresponding steering wheel angle of the vehicle may be determined based on the heading angle of the vehicle. For different vehicles, the correspondence between the heading angle of the vehicle and the steering wheel angle of the vehicle is different. This is not limited in this embodiment of this application.

1605: Determine a compensation direction based on the steering wheel angle information and a detour distance.

Figure 17:
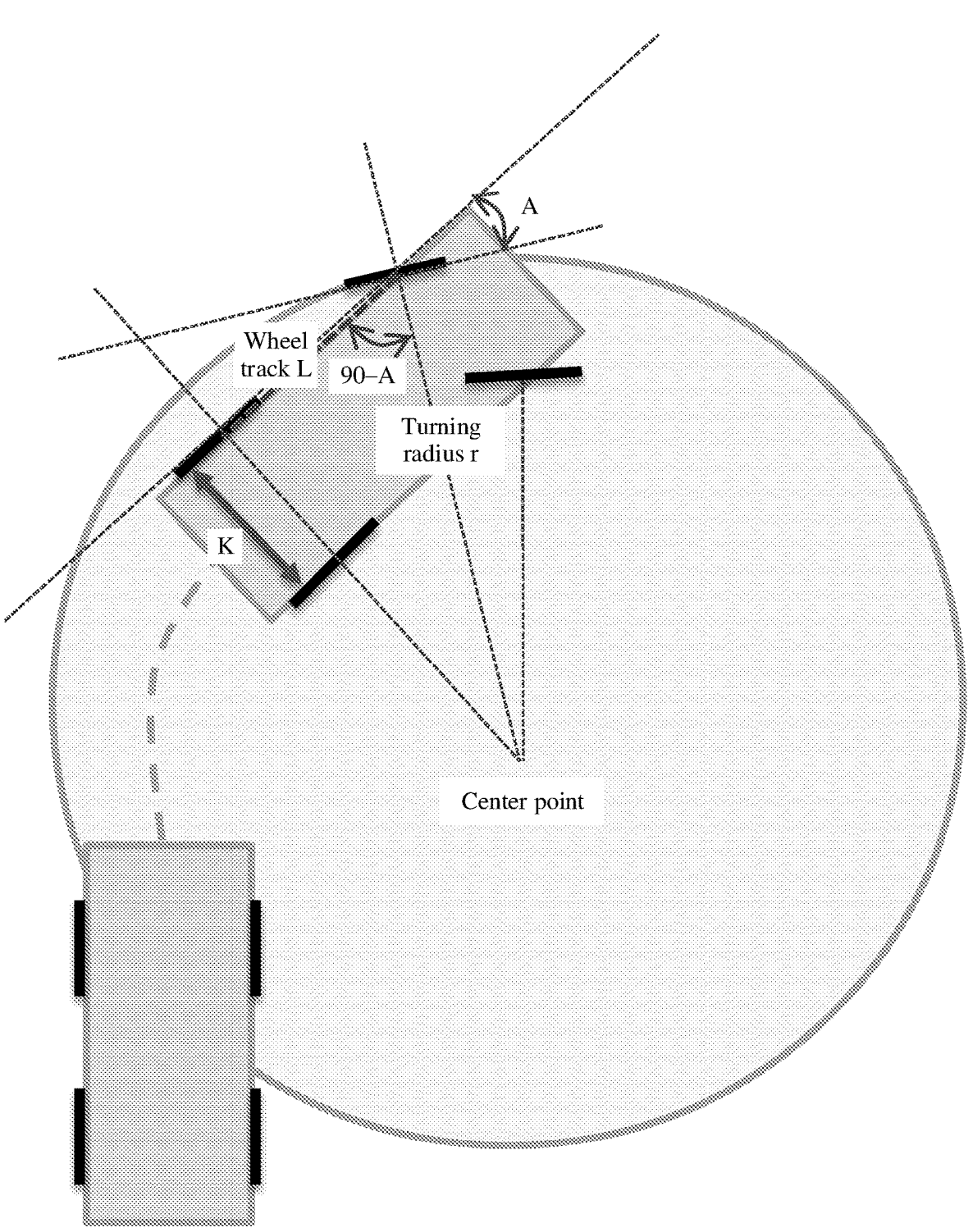
FIG. 17 is a schematic diagram of another application scenario according to an embodiment of this application.

A compensation direction is determined based on the steering wheel angle information, a wheel track, duration, and the speed, where the duration is required duration from a moment at which it is detected that the vehicle speed is less than the third preset value to a moment at which the vehicle stops, and the speed is a real-time speed of the vehicle after it is detected that the vehicle speed is less than the third preset value. FIG. 17 is a schematic diagram of another application scenario according to this embodiment of this application. The following describes how to determine the compensation direction with reference to FIG. 17.

According to the Ackermann principle, when the vehicle is turning, all the tires are in a pure rolling state without sliding, and each tire conforms to its own natural law, that is, all the wheels move around a same "center point", so that a steering angle relationship between the inner and outer wheels is obtained as follows:

$$\cos(90 - A) = \frac{L}{r};$$

$$r = \frac{L}{\cos(90 - A)}.$$

Herein, A represents an included angle of the tire, L represents the wheel track, and r represents a turning radius. Assuming that D represents the detour distance and D is an arc length, $$D = speed \times time.$$

The duration is the required duration from the moment at which it is detected that the vehicle speed is less than the third preset value to the moment at which the vehicle stops, and the speed is the real-time speed of the vehicle after it is detected that the vehicle speed is less than the third preset value. Assuming that γ represents the compensation direction and γ is a vehicle head angle, $$\gamma = 360 \times D / 2\pi r.$$

The following describes a relationship between the tire angle A and an included steering wheel angle c. Generally, the tire is locked only when the steering wheel rotates about 2.5 turns, that is, about 60 degrees, and the two are linear. In this case, $A = k \times C$, where C represents the steering wheel angle. A value of k is set differently by each vehicle manufacturer. This is not limited in this embodiment of this application.

1606: Determine a navigation guide based on a second navigation direction and the compensation direction.

Figure 18:
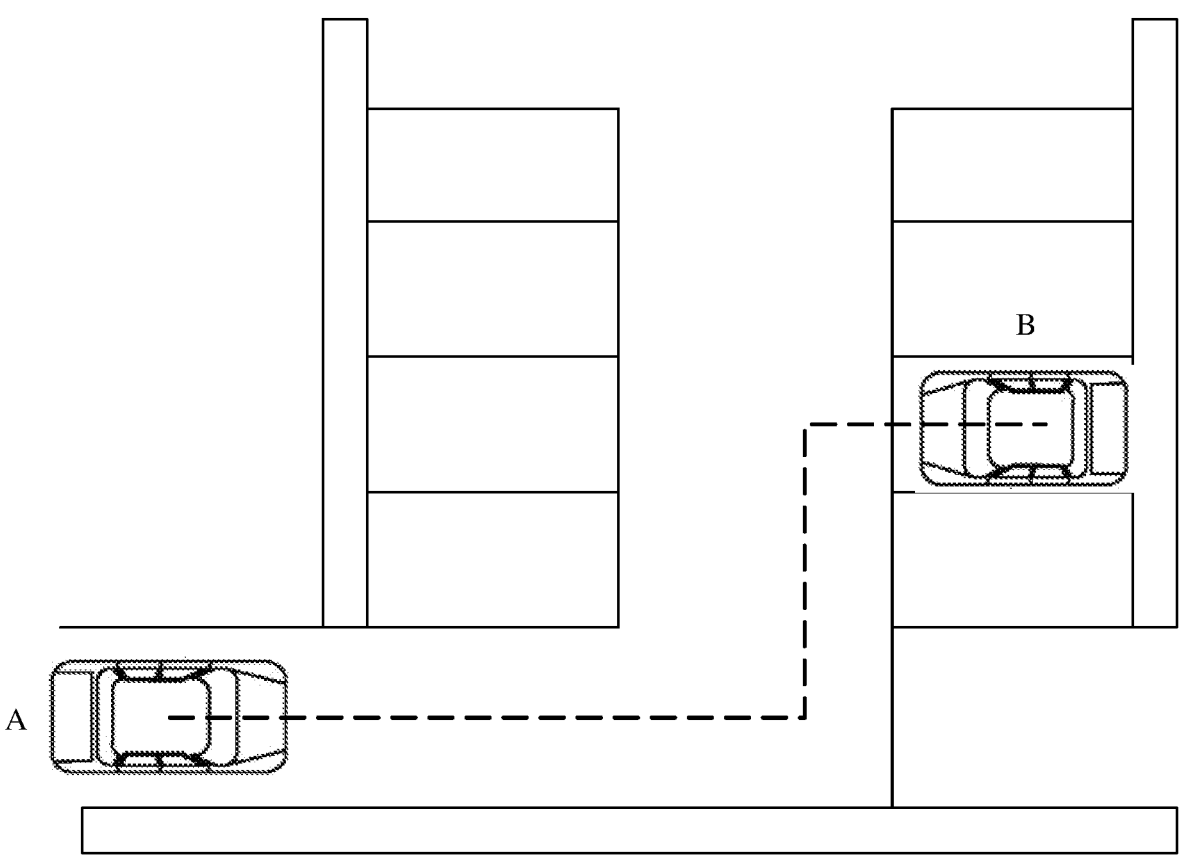
FIG. 18 is a schematic diagram of another application scenario of a solution according to this application.

FIG. 18 is a schematic diagram of another application scenario according to this embodiment of this application. In the scenario shown in FIG. 17, the vehicle slowly moves into a parking space. For example, as shown in FIG. 18, the vehicle moves into a parking space B from a position A. The vehicle speed is slow in this process, for example, the vehicle speed is less than the third preset value. Therefore, the steering wheel angle information of the vehicle is obtained in this process. The track points change in a small range in the parking process, and the direction may not be accurately predicted based on the traveling track determined by the GPS. Therefore, a final heading of the vehicle is jointly determined based on the compensation direction and the direction determined based on the traveling track. For example, a final heading of the vehicle is jointly determined based on a sum of the compensation direction and the direction determined based on the traveling track.

The foregoing describes the navigation method provided in this embodiment of this application. According to the solution provided in this application, according to the current navigation track deviation correction method, correction can be performed only after a user travels for a specific distance. As a result, a vehicle misses an important intersection, or needs to turn around after following an incorrect direction. According to the technical solutions provided in this application, deviation correction of a navigation instruction can be completed when the vehicle is stationary. In a driving scenario, the same calculation method can also be used to reduce a driving distance and a deviation correction time, so as to complete deviation correction of the navigation instruction in advance.

It should be noted that the navigation method provided in this application may be performed by using two devices. For example, this application further provides a navigation system. The navigation system includes a mobile terminal and a vehicle. The mobile terminal obtains a navigation request. The navigation request includes location information of a start place and location information of a destination that are of the vehicle. In response to the navigation request, the mobile terminal sends an instruction to the vehicle or a navigation module of the vehicle. The instruction is used to instruct the vehicle or the navigation module of the vehicle to send a heading of the vehicle. In response to the instruction, the vehicle or the navigation module of the vehicle sends the heading of the vehicle to the mobile terminal. The heading of the vehicle is determined based on a traveling track stored in the vehicle. The mobile terminal navigates the vehicle based on the location information of the start place, the location information of the destination, and the heading of the vehicle.

An embodiment of this application further provides a mobile terminal. The mobile terminal device in this application may be various handheld devices, wearable devices, or computing devices that have a communication function, or another processing device connected to a wireless modem, or the like. For example, the mobile terminal may be a personal digital assistant (PDA) computer, a tablet computer, a wireless modem, a handset, a laptop computer, or a machine-type-communication (MTC) terminal.

In a possible implementation, the mobile terminal includes a first obtaining module, configured to obtain a navigation request, where the navigation request includes location information of a start place and location information of a destination; a communications module, configured to send an instruction to a vehicle or a navigation module of the vehicle in response to the navigation request, where the instruction is used to instruct the vehicle or the navigation module of the vehicle to send heading of the vehicle information, and the communications module is further configured to receive the heading of the vehicle information sent by the vehicle or the navigation module of the vehicle, where the heading of the vehicle information is determined based on a stored traveling track; and a navigation module, configured to perform navigation planning on the vehicle based on the location information of the start place, the location information of the destination, and the heading of the vehicle information.

In a possible implementation, the navigation module is configured to determine a first navigation direction based on the location information of the start place and the location information of the destination; and navigate the vehicle based on an included angle between the first navigation direction and a heading of the vehicle.

In a possible implementation, the navigation module is configured to send a prompt message when the included angle falls within a first preset range, where the prompt message is used to indicate the vehicle to turn around.

In a possible implementation, the navigation module is configured to send a prompt message when the included angle falls within a second preset range, where the prompt message is used to indicate the vehicle to turn left or turn right.

In a possible implementation, the navigation module is configured to send a prompt message when the included angle falls within a third preset range, where the prompt message is used to indicate the vehicle to travel in the first navigation direction.

In a possible implementation, the traveling track is a segment of traveling track that is stored before the navigation request is obtained and that is at a preset distance from a current location of the vehicle. The traveling track includes N track points. The track point is used to indicate location information of the vehicle. The heading of the vehicle information includes curvatures of the N track points.

In a possible implementation, the communications module is further configured to receive compensation direction information of the vehicle. The compensation direction information is used to update the heading of the vehicle, and the compensation direction information includes steering wheel information, a wheel track, duration, and a speed. The steering wheel information is steering wheel angle information obtained when the vehicle detects that a vehicle speed is less than a third preset value, the duration is required duration from a moment at which the vehicle detects that the vehicle speed is less than the third preset value to a moment at which the vehicle stops, and the speed is a real-time speed of the vehicle. The compensation direction information that is of the vehicle and that is received by the communications module of the mobile terminal may come from different devices. For example, the communications module may receive compensation direction information sent by the vehicle or the navigation module of the vehicle, or the communications module may receive compensation direction information that is of the vehicle and that is sent by a cloud-side device.

Figure 19:
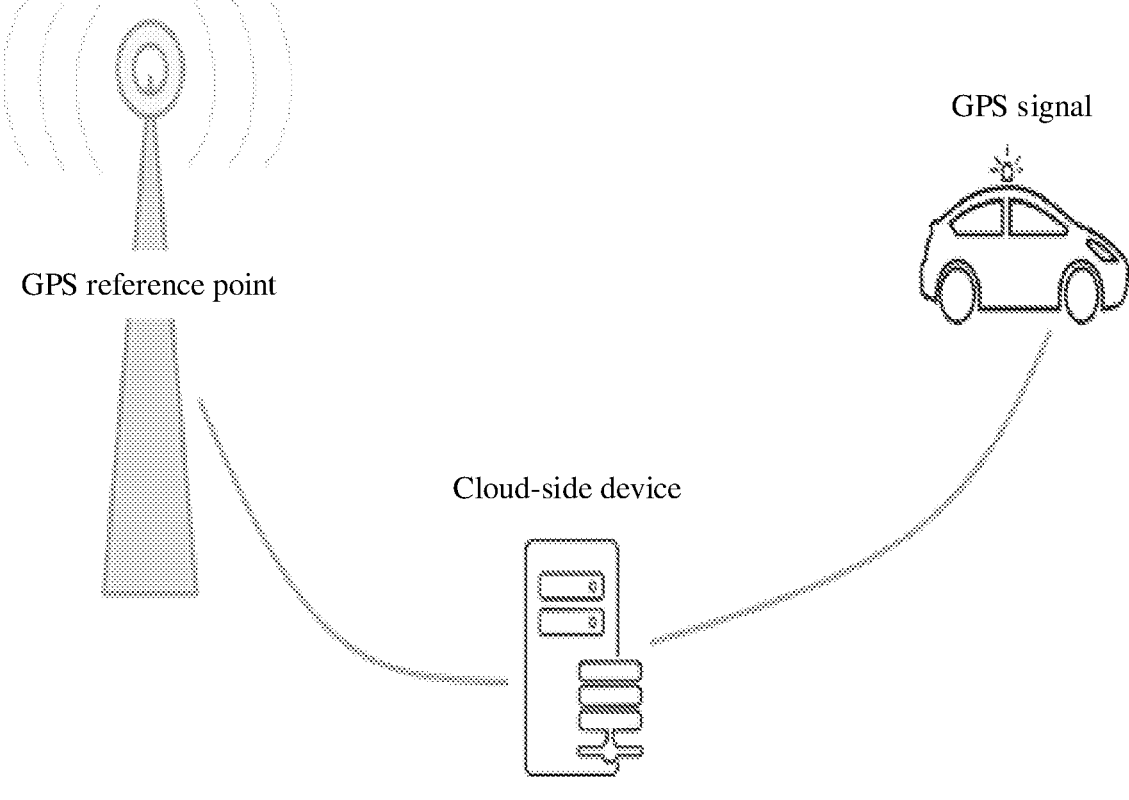
FIG. 19 is a schematic architectural diagram of a navigation system according to this application.

For another example, the solution provided in this application may be further implemented by combining the vehicle with the cloud-side device. The following provides descriptions with reference to FIG. 19. FIG. 19 is a schematic architectural diagram of a navigation system according to this application. The navigation system includes a cloud-side device and a vehicle. The vehicle obtains a navigation request. The navigation request includes location information of a start place and location information of a destination that are of the vehicle. In response to the navigation request, the vehicle sends a heading of the vehicle to the cloud-side device. The heading of the vehicle is determined based on a traveling track stored in the vehicle. The cloud-side device plans a navigation direction and a navigation route for the vehicle based on the location information of the start place, the location information of the destination, and the heading of the vehicle.

In a possible implementation, the cloud-side device may be a vehicle-cloud positioning server. The vehicle-cloud positioning server may directly determine the traveling track of the vehicle based on an obtained GPS signal, and then determine the heading of the vehicle based on the traveling track. For understanding how the vehicle-cloud positioning server determines the heading of the vehicle based on the traveling track of the vehicle, refer to a manner in which the vehicle determines the heading of the vehicle based on the traveling track. Details are not described herein again. In this implementation, after obtaining the navigation request, the vehicle may send indication information to the cloud-side device. In a possible implementation, the indication information may include a name of the start place of the vehicle and a name of the destination of the vehicle, and the cloud-side device determines the location information of the start place and the location information of the destination that are of the vehicle based on the name of the start place and the name of the destination of the vehicle. The cloud-side device determines the heading of the vehicle based on the locally stored traveling track, and navigates the vehicle based on the determined location information of the start place, location information of the destination, and the heading of the vehicle that are of the vehicle. In a possible implementation, the indication information may include the location information of the start place of the vehicle and the location information of the destination of the vehicle, and the cloud-side device determines the heading of the vehicle based on the locally stored traveling track, and navigates the vehicle based on the determined location information of the start place, location information of the destination, and the heading of the vehicle that are of the vehicle. In a possible implementation, the indication information may include the location information of the destination of the vehicle. The cloud-side device determines the location information of the start place of the vehicle based on a current location of the vehicle, and the cloud-side device determines the heading of the vehicle based on the locally stored traveling track, and navigates the vehicle based on the determined location information of the start place, location information of the destination, and the heading of the vehicle that are of the vehicle.

In a possible implementation, differential navigation and an L1/L5 (L1 and L5 represent an L1 band and an L5 band of a GPS) dual-band GPS may be used. In the differential navigation, pseudorange correction or location correction is first obtained by using a differential GPS reference platform with known accurate three-dimensional coordinates, and then the correction is sent to a user (GPS navigator) in real time or afterward to correct measurement data of the user, so as to improve GPS positioning accuracy.

The solution provided in this application can bring better driving experience to a driver. In a start navigation scenario, a more accurate direction can be planned to avoid the driver taking a wrong road. In a driving navigation scenario, a time required for deviation correction can be reduced, and navigation efficiency can be improved. The following describes, with reference to a possible application scenario, that the solution provided in this embodiment of this application can bring better driving experience to a driver.

Figure 20A:
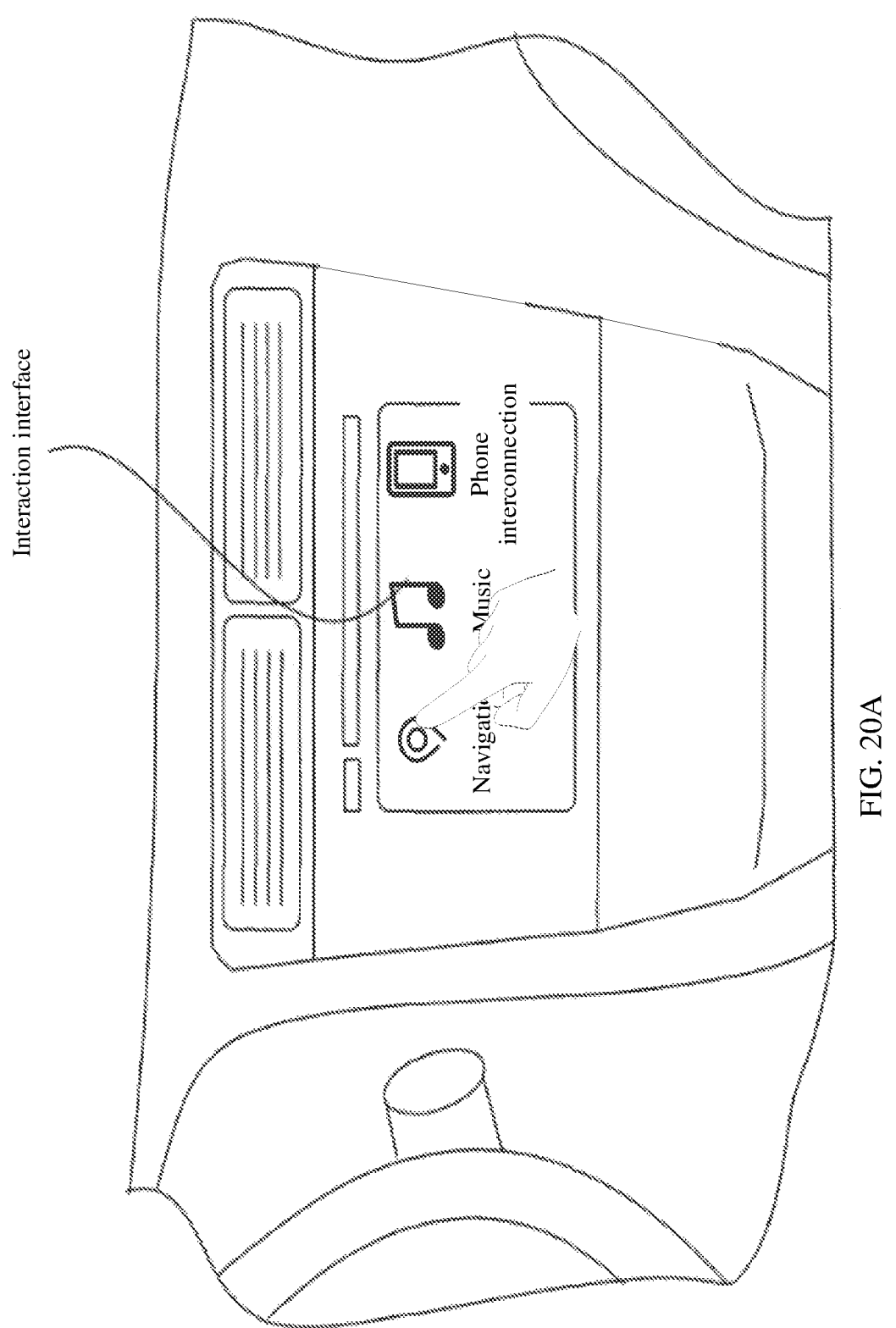
FIG. 20A is a schematic diagram of another application scenario of a solution according to this application.
Figure 20B:
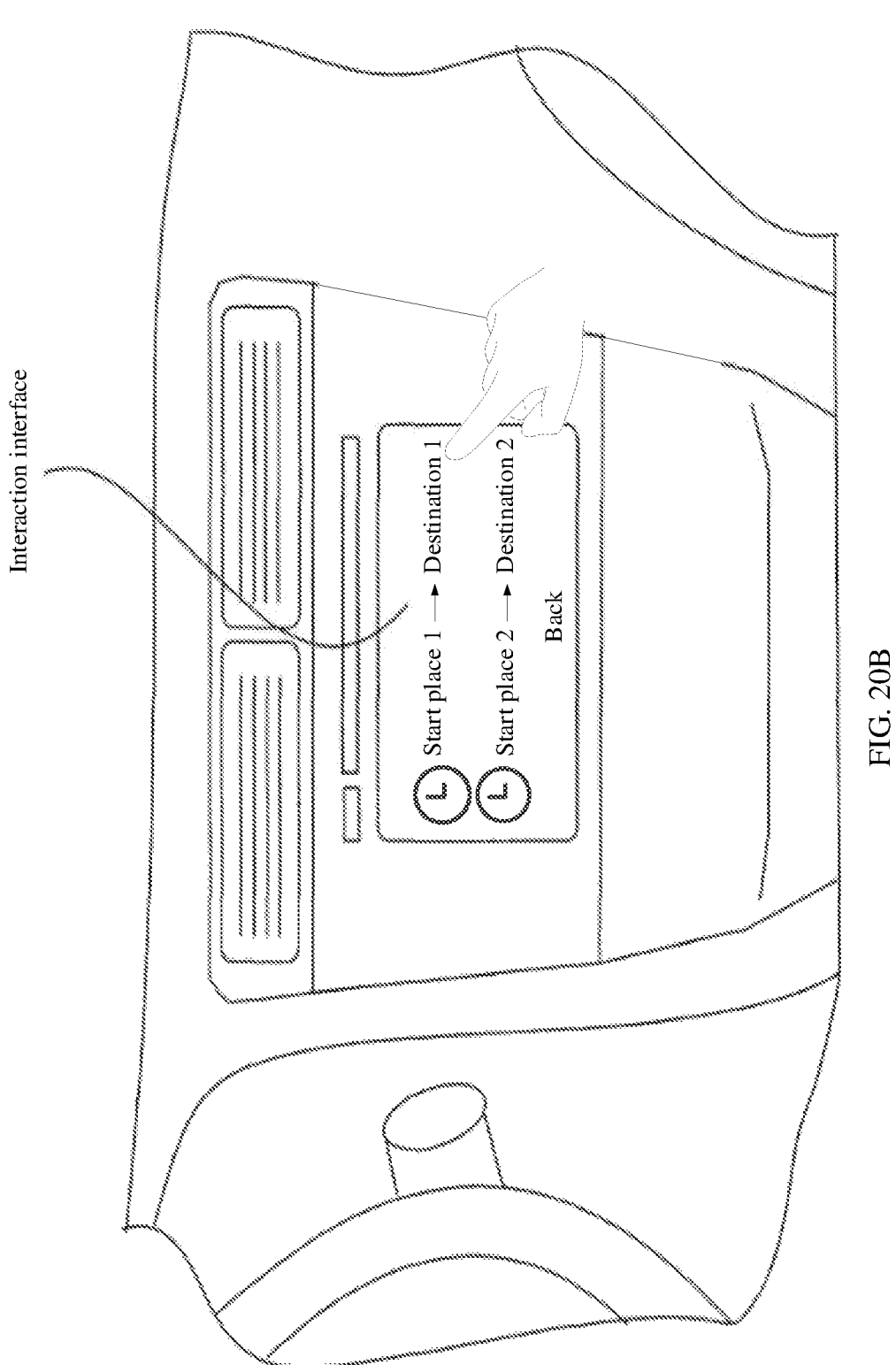
FIG. 20B is a schematic diagram of another application scenario of a solution according to this application.
Figure 20C:
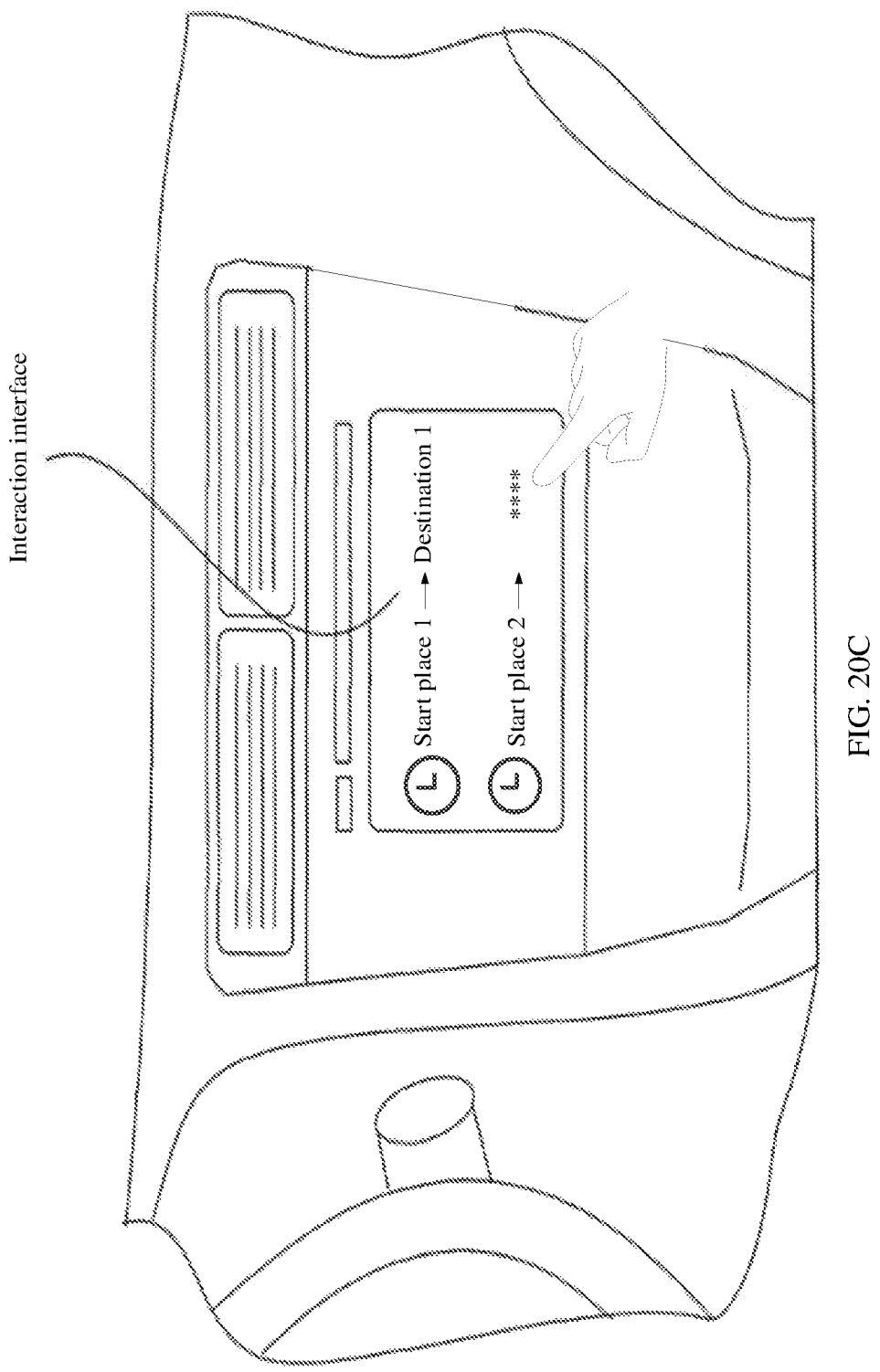
FIG. 20C is a schematic diagram of another application scenario of a solution according to this application.
Figure 20D:
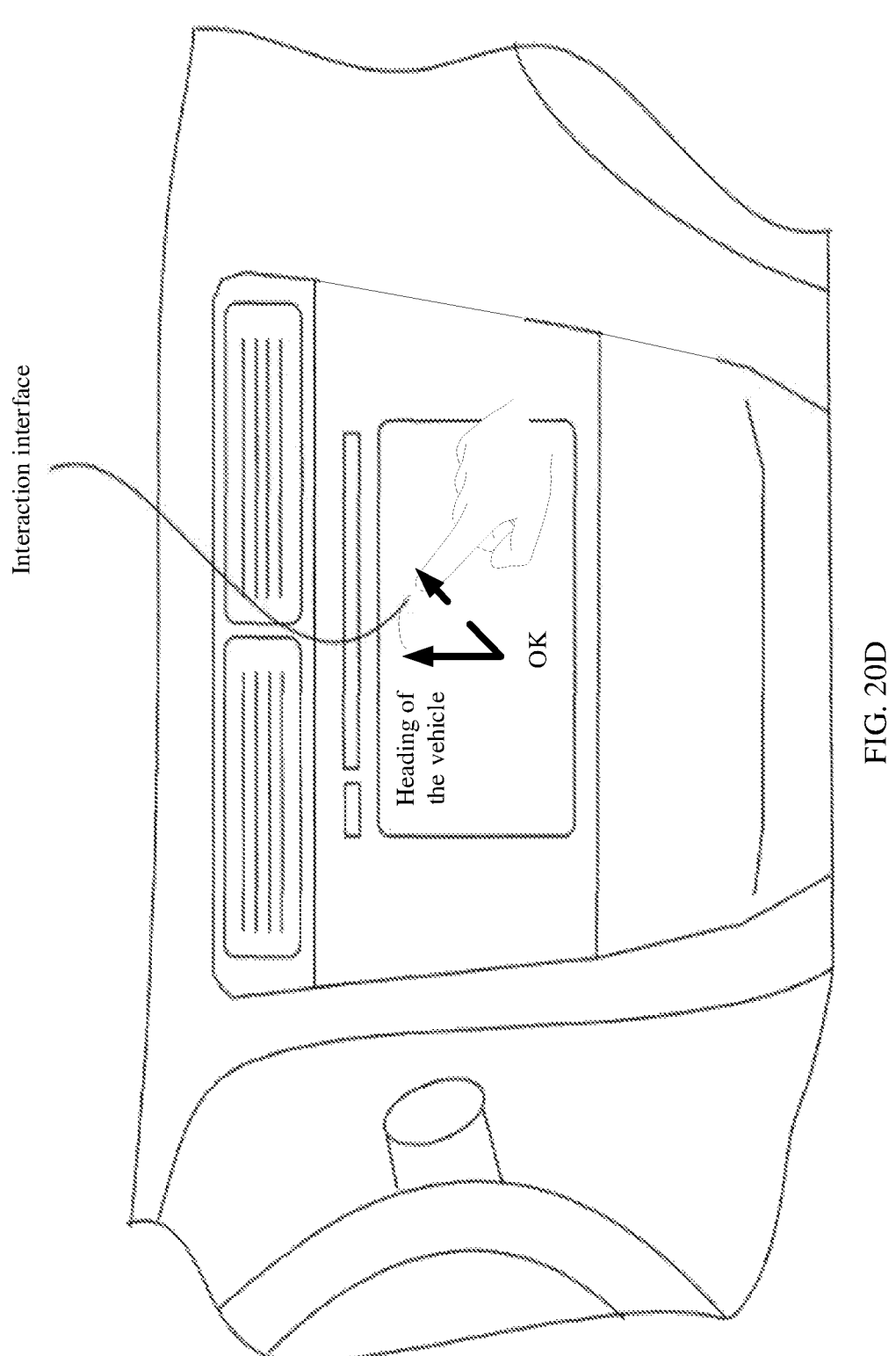
FIG. 20D is a schematic diagram of another application scenario of a solution according to this application.
Figure 20E:
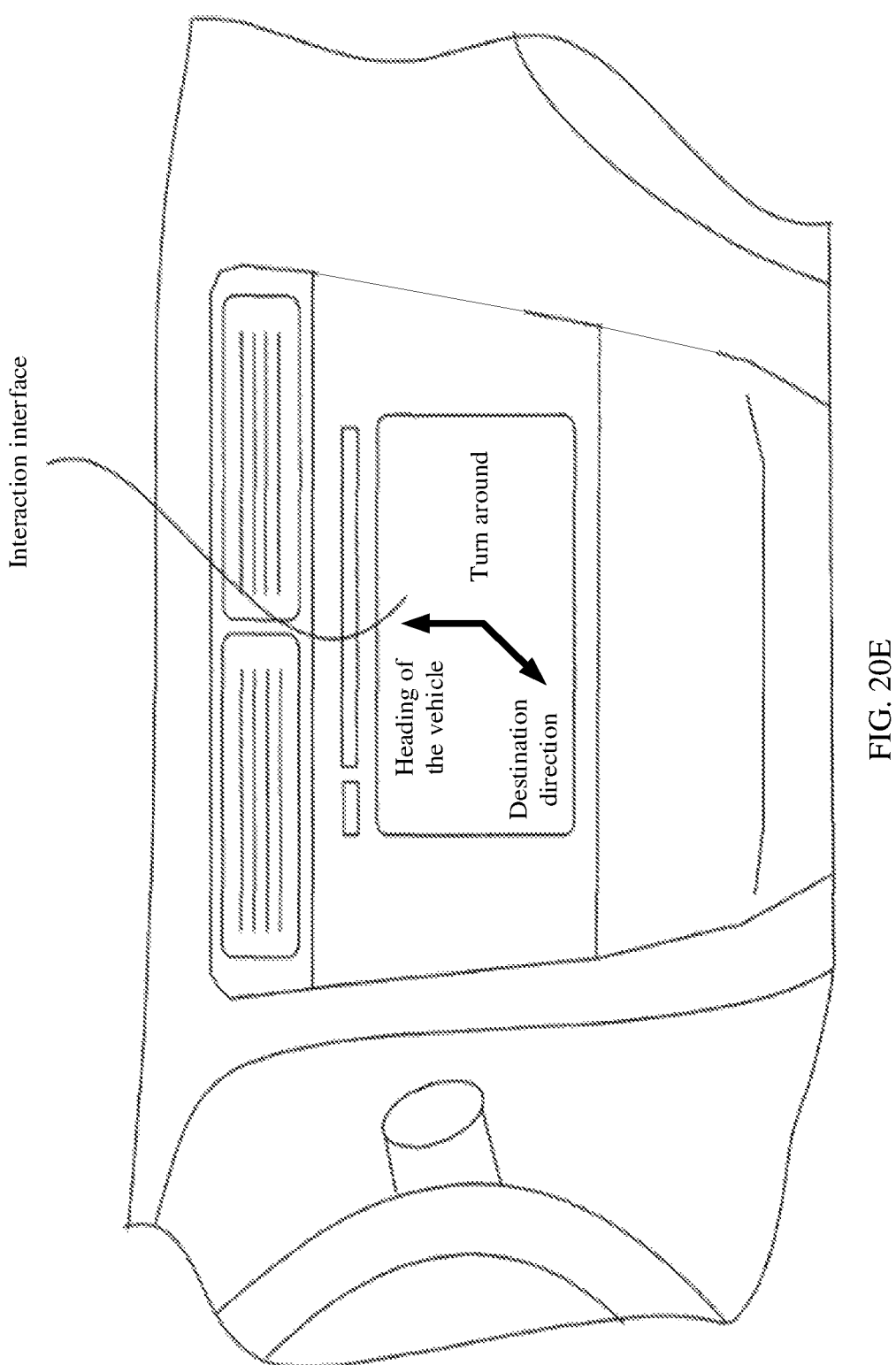
FIG. 20E is a schematic diagram of another application scenario of a solution according to this application.
Figure 20F:
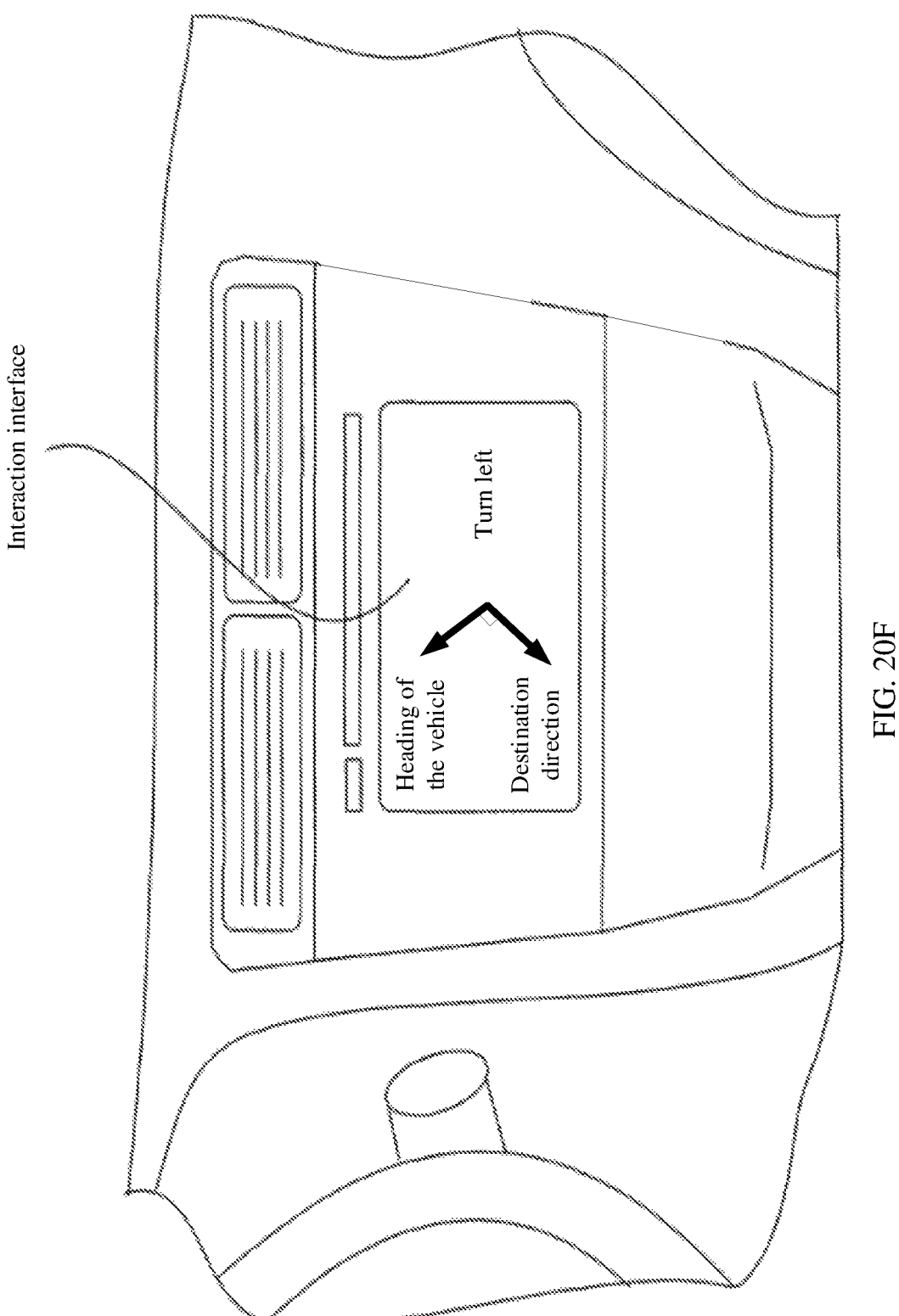
FIG. 20F is a schematic diagram of another application scenario of a solution according to this application.

As shown in FIG. 20A, after starting a vehicle-mounted device, a user may select an application on an interaction interface (for example, a display of the vehicle-mounted device). For example, the interaction interface in FIG. 20A shows three applications such as navigation, music, and phone interconnection. It should be noted that the three applications displayed on the interaction interface are merely examples for description, and do not represent a limitation on this solution. The user may tap an icon corresponding to the navigation application to enter a navigation interface, and enter a start place and a destination. It should be noted that the vehicle-mounted device may also be started in another manner, for example, that navigation is started by using a voice instruction of the user mentioned above. This is not limited in this solution. Further, the start place and the destination may be obtained in another manner, for example, the plurality of manners mentioned above. Details are not described herein again. For example, in one manner, as shown in FIG. 20B, the vehicle-mounted device may recommend a start place and a destination for the user according to preset settings by the user. For example, the user sets two groups of common routes such as from a start place 1 to a destination 1, and from a start place 2 to a destination 2. In this case, when the user uses navigation, recommendations may be pushed to the user according to the preset settings by the user such as from the start place 1 to the destination 1, and from the start place 2 to the destination 2, and the user taps the recommended route to start navigation. Alternatively, the vehicle-mounted device may recommend a start place and a destination for the user based on a historical record of using in-vehicle navigation. For example, the vehicle-mounted device may recommend start places and destinations of routes recently used by the user for the user to select. When the recommended route is not the one desired by the user, the user may also re-enter a start place and a destination. For example, the user may tap Back on the interaction interface to re-enter the start place and the destination. In a possible implementation, as shown in FIG. 20C, the user may modify the start place or the destination of the route recommended by the vehicle-mounted device. For example, if the start place is 2, but the user does not want to go to the destination 2, the user may modify the destination 2 to another address. In a possible implementation, the vehicle-mounted device may use each start place address and destination address that are set by the user as training data to train a neural network model, to better recommend a start place and a destination to the user. After obtaining a start place and a destination that are confirmed by the user, a vehicle-mounted navigation device may plan navigation for the vehicle according to the solution provided in this embodiment of this application. Compared with planning navigation for the vehicle based only on the start place and the destination in the conventional technology, the solution provided in this application combines a heading of the vehicle. This can improve accuracy of navigation. In a possible implementation, the vehicle-mounted device may display, to the user, a navigation direction finally determined with reference to the heading of the vehicle, and directly prompt the user to travel according to a planned direction, for example, directly prompt the user to turn around or turn left. In a possible implementation, the vehicle-mounted device may alternatively present a calculated heading of the vehicle to the user, and the user determines whether the heading of the vehicle is accurate. As shown in FIG. 20D, in a possible implementation, the user is allowed to adjust the heading of the vehicle on the interaction interface, and the vehicle-mounted device re-determines the final navigation direction based on the heading of the vehicle adjusted by the user. In a possible implementation, as shown in FIG. 20E, both a first navigation direction and the heading of the vehicle may be alternatively displayed to the user. The first navigation direction is a navigation direction determined based on the start place and the destination. In this implementation, the user may be prompted with a second navigation direction, that is, a navigation direction determined based on the first navigation direction and the heading of the vehicle. In this implementation, the user is also allowed to adjust the heading of the vehicle, and the vehicle-mounted device may re-determine the second navigation direction based on an updated heading of the vehicle, and update navigation. For example, as shown in FIG. 20E, it is determined, based on the heading of the vehicle and the first navigation direction (the destination direction in FIG. 20E), that the navigation direction finally presented to the user is turning around. If the user adjusts the heading of the vehicle in FIG. 20E, for example, adjusts to the heading of the vehicle shown in FIG. 20F, the vehicle-mounted device re-determines the navigation direction based on the adjusted heading of the vehicle in FIG. 20F, and updates the navigation direction displayed to the user. For example, as shown in FIG. 20E and FIG. 20F, navigation displayed to the user is updated from turning around to turning left.

It should be understood that the navigation method provided in this application may be performed by an electronic apparatus. The electronic apparatus may be an entire computing device, or may be some components in the computing device. For example, the electronic apparatus may be a navigation-related chip. In an example, the electronic apparatus may be a terminal such as an automobile or a navigation device in an automobile, or may be a system chip or a navigation chip that can be disposed in the terminal. The system chip is also referred to as a system on a chip, or is referred to as an SoC chip. In physical implementation, the navigation chip may be integrated inside the system chip, or may not be integrated with the system chip.

According to the embodiments corresponding to FIG. 1 to FIG. 18, to better implement the foregoing solutions in the embodiments of this application, the following further provides related devices configured to implement the foregoing solutions.

Figure 21:
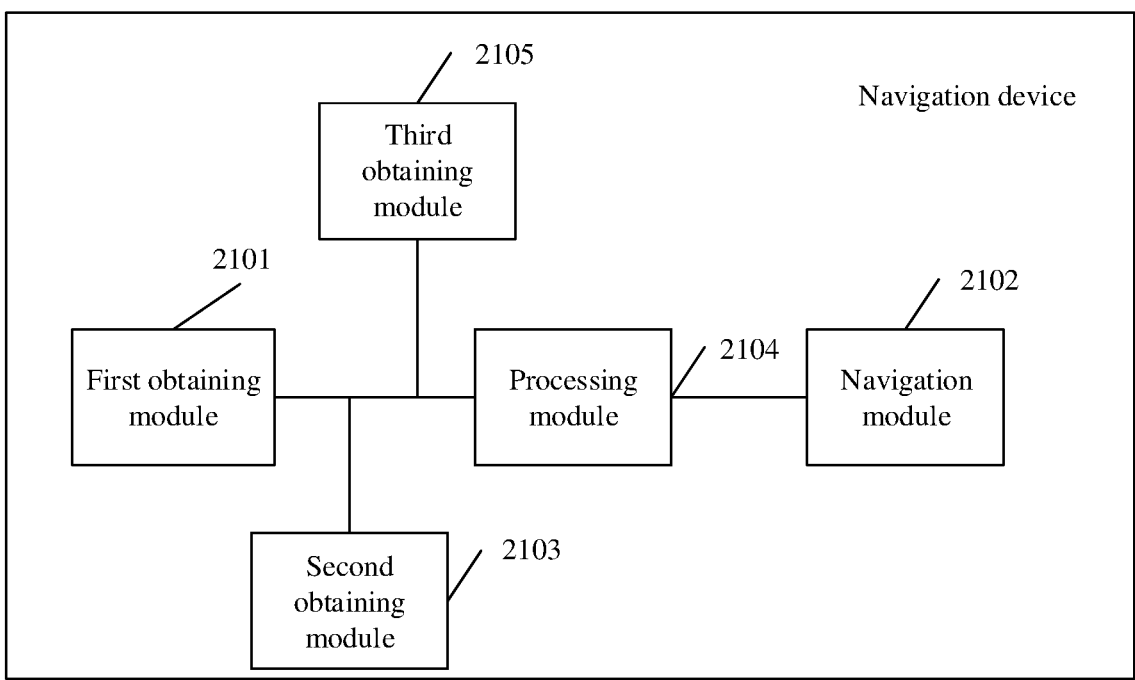
FIG. 21 is a schematic diagram of a structure of a navigation device according to an embodiment of this application.

FIG. 21 is a schematic diagram of a structure of a navigation device according to an embodiment of this application. The navigation device provided in this application may include a first obtaining module 2101 and a navigation module 2102.

The first obtaining module 2101 is configured to obtain a navigation request. The navigation request includes location information of a start place and location information of a destination that are of a vehicle. The navigation module 2102 is configured to navigate the vehicle based on the location information of the start place, the location information of the destination, and a heading of the vehicle that are obtained by the first obtaining module 2101. The heading of the vehicle is determined based on a traveling track stored before the navigation request is obtained.

In a possible implementation, the navigation module 2102 is configured to determine a first navigation direction based on the location information of the start place and the location information of the destination, and navigate the vehicle based on an included angle between the first navigation direction and the heading of the vehicle.

In a possible implementation, the navigation module 2102 is configured to send a prompt message when the included angle falls within a first preset range, where the prompt message is used to indicate the vehicle to turn around.

In a possible implementation, the navigation module 2102 is configured to send a prompt message when the included angle falls within a second preset range, where the prompt message is used to indicate the vehicle to turn left or turn right.

In a possible implementation, the navigation module 2102 is configured to send a prompt message when the included angle falls within a third preset range, where the prompt message is used to indicate the vehicle to travel in the first navigation direction.

In a possible implementation, the traveling track is a segment of traveling track that is at a preset distance from a current location of the vehicle. The device further includes a second obtaining module 2103 and a processing module 2104. The second obtaining module 2103 is configured to obtain N track points based on the traveling track, where the track point is used to indicate location information of the vehicle, and N is a positive integer. The processing module 2104 is configured to determine the heading of the vehicle based on curvatures of the N track points obtained by the second obtaining module 2103. The processing module 2104 is configured to, when a curvature change rate of the N track points is not greater than a first preset value, determine the heading of the vehicle based on location information of any two track points in the N track points.

In a possible implementation, the processing module 2104 is configured to, when the curvature change rate of the N track points is greater than the first preset value, determine the heading of the vehicle based on the curvature change rate of the N track points and a vehicle speed.

In a possible implementation, the second obtaining module 2103 is configured to determine a plurality of track points based on the traveling track. The processing module 2104 is configured to delete M track points in the plurality of track points based on a preset condition, to obtain the N track points. The preset condition includes one or more of a first preset condition and a second preset condition, the first preset condition is that curvatures of the M track points are greater than a second preset value, and the second preset condition is that a vehicle gear corresponding to the M track points is a neutral gear.

In a possible implementation, a third obtaining module 2105 is further included. The third obtaining module 2105 is configured to obtain steering wheel angle information when it is detected that the vehicle speed is less than a third preset value. The processing module 2104 is further configured to determine a compensation direction based on the steering wheel angle information, a wheel track, duration, and a speed. The duration is required duration from a moment at which it is detected that the vehicle speed is less than the third preset value to a moment at which the vehicle stops, and the speed is a real-time speed of the vehicle after it is detected that the vehicle speed is less than the third preset value. The processing module 2104 is further configured to update, based on the compensation direction, the heading of the vehicle determined based on the curvatures of the N track points.

In a possible implementation, the first obtaining module is configured to perform step 201 in the embodiment corresponding to FIG. 2, and the navigation module is configured to perform step 202 in the embodiment corresponding to FIG. 2.

In a possible implementation, the first obtaining module is configured to perform step 901 in the embodiment corresponding to FIG. 9, and the navigation module is configured to perform step 902 to step 906 in the embodiment corresponding to FIG. 9.

In a possible implementation, the first obtaining module is configured to perform step 1301 in the embodiment corresponding to FIG. 13, and the navigation module is config-
ured to perform step 1302 in the embodiment corresponding
to FIG. 13. The second obtaining module is configured to
perform step 1303 in the embodiment corresponding to FIG.
13. The processing module is configured to perform step
1304 in the embodiment corresponding to FIG. 13. The
navigation module is configured to perform step 1305 and
step 1306 in the embodiment corresponding to FIG. 13.

In a possible implementation, the first obtaining module is
configured to perform step 1601 in the embodiment corre-
sponding to FIG. 16, and the navigation module is config-
ured to perform step 1602 and step 1603 in the embodiment
corresponding to FIG. 16. The third obtaining module is
configured to perform step 1604 in the embodiment corre-
sponding to FIG. 16. The processing module is configured to
perform step 1605 in the embodiment corresponding to FIG.
16. The navigation module is configured to perform step
1606 in the embodiment corresponding to FIG. 16.

It should be noted that content such as information
exchange and an execution process between the modules/
units in the navigation device is based on a same concept as
the method embodiments corresponding to FIG. 1 to FIG. 18
in this application. For specific content, refer to the descrip-
tions in the foregoing method embodiments in this applica-
tion. Details are not described herein again.

Figure 22:
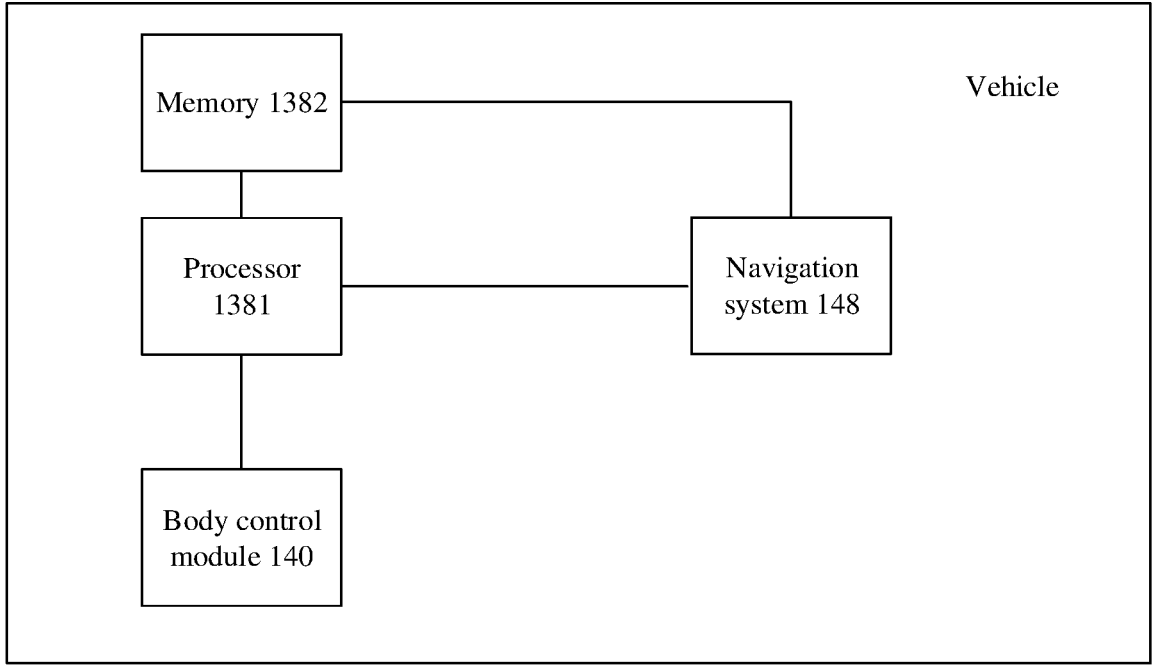
FIG. 22 is a schematic diagram of a structure of a vehicle according to an embodiment of this application.

An embodiment of this application further provides a
vehicle. With reference to the foregoing description of FIG.
1, refer to FIG. 22. FIG. 22 is a schematic diagram of a
structure of the vehicle according to this embodiment of this
application. The navigation device described in the embodi-
ment corresponding to FIG. 19 may be deployed on the
vehicle, and is configured to implement functions of the
vehicle in the embodiments corresponding to FIG. 1 to FIG.
18.

In a possible implementation, the vehicle includes a
processor. The processor is coupled to a memory. The
memory stores program instructions, and when the program
instructions stored in the memory are executed by the
processor, the methods described in FIG. 1 to FIG. 18 are
performed.

In a possible implementation, the processor includes a
navigation system 148, configured to obtain a navigation
request. The navigation request includes location informa-
tion of a start place and location information of a destination
that are of the vehicle. The navigation system 148 is further
configured to navigate the vehicle based on the location
information of the start place, the location information of the
destination, and a heading of the vehicle. The heading of the
vehicle is determined based on a traveling track stored
before the navigation request is obtained.

In a possible implementation, the navigation system 148
is configured to determine a first navigation direction based
on the location information of the start place and the location
information of the destination, and navigate the vehicle
based on a relationship between a preset angle and an
included angle between the first navigation direction and the
heading of the vehicle.

In a possible implementation, the navigation system 148
is configured to send a prompt message when the included
angle falls within a first preset range, where the prompt
message is used to indicate the vehicle to turn around.

In a possible implementation, the navigation system 148
is configured to send a prompt message when the included
angle falls within a second preset range, where the prompt
message is used to indicate the vehicle to turn left or turn
right.

In a possible implementation, the navigation system 148
is configured to send a prompt message when the included
angle falls within a third preset range, where the prompt
message is used to indicate the vehicle to travel in the first
navigation direction.

In a possible implementation, the traveling track is a
segment of traveling track that is at a preset distance from a
current location of the vehicle. The device further includes
a memory 1382, and the memory 1382 is configured to store
the traveling track of the vehicle and N track points, where
the track point is used to indicate location information of the
vehicle, and N is a positive integer. A processor 1381 is
configured to determine a heading of the vehicle based on
curvatures of the N track points. The processor 1381 is
configured to, when a curvature change rate of the N track
points is not greater than a first preset value, determine the
heading of the vehicle based on location information of any
two track points in the N track points.

In a possible implementation, the processor 1381 is con-
figured to, when the curvature change rate of the N track
points is greater than the first preset value, determine the
heading of the vehicle based on the curvature change rate of
the N track points and a vehicle speed.

In a possible implementation, the processor 1381 is con-
figured to delete M track points in a plurality of track points
based on a preset condition, to obtain the N track points. The
preset condition includes one or more of a first preset
condition and a second preset condition, the first preset
condition is that curvatures of the M track points are greater
than a second preset value, and the second preset condition
is that a vehicle gear corresponding to the M track points is
a neutral gear.

In a possible implementation, a vehicle control unit 140 is
further included. The vehicle control unit 140 is configured
to obtain steering wheel angle information when it is
detected that the vehicle speed is less than a third preset
value. The processor 1381 is further configured to determine
a compensation direction based on the steering wheel angle
information, a wheel track, duration, and a speed. The
duration is required duration from a moment at which it is
detected that the vehicle speed is less than the third preset
value to a moment at which the vehicle stops, and the speed
is a real-time speed of the vehicle after it is detected that the
vehicle speed is less than the third preset value. The pro-
cessor 1381 is further configured to update, based on the
compensation direction, the heading of the vehicle deter-
mined based on the curvatures of the N track points.

In a possible implementation, a sensor system 104 can
provide latitude and longitude information of a location in
which the vehicle is located. A navigation module provides
a route planning capability and a navigation capability as a
user enters geographical location values of start and end
points. The processor 1381 may perform calculation on data.
The memory 1382 provides data storage, including storage
of an address, a route, and a driving direction in this
application. The vehicle control unit 140 provides informa-
tion about engine status, speed, gear, steering wheel angle,
and the like of the vehicle to the processor 1381. A data
stream of each module is that the user selects a destination
on the navigation system 148, and then initiates navigation
by using the navigation system 148. The navigation system
148 checks a location of the current vehicle and the heading
of the vehicle before displaying navigation guidance infor-
mation to the user. The location of the vehicle is provided by
the sensor system 104. The heading of the vehicle is
determined based on vehicle information provided by the
vehicle control unit 140. The processor 1381 is configured to process data of the information and then store data results in the memory 1382 for invoking by the navigation system 148.

It should be noted that, for the navigation device, a specific implementation of performing the navigation method by the vehicle and beneficial effects, refer to descriptions in the method embodiments corresponding to FIG. 1 to FIG. 18. Details are not described herein again.

An embodiment of this application further provides a computer-readable storage medium. The computer-readable storage medium stores a program used for navigation. When the program runs on a computer, the computer is enabled to perform the steps performed by the vehicle and the navigation device in the methods described in the embodiments shown in FIG. 1 to FIG. 18.

An embodiment of this application further provides a computer program product. When the computer program product runs on a computer, the computer is enabled to perform the steps performed by the vehicle and the navigation device in the methods described in the embodiments shown in FIG. 1 to FIG. 18. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a Digital Video Disk (DVD)), a semiconductor medium (for example, a solid-state drive (or solid state disk (SSD)), or the like.

An embodiment of this application further provides a circuit system. The circuit system includes a processing circuit and a storage circuit. The processing circuit and the storage circuit are configured to perform the steps performed by the vehicle and the navigation device in the methods described in the embodiments shown in FIG. 1 to FIG. 18. The processing circuit may be any suitable type of computing unit, for example, a microprocessor, a digital signal processor (DSP), a FPGA, an ASIC, or any other form of circuit. The storage circuit may be volatile and/or non-volatile. For example, the storage circuit may be a register, a cache, or the like. In an example, a volatile storage circuit may include a cache memory, and a non-volatile storage circuit may include a flash memory.

The navigation apparatus or the vehicle provided in the embodiments of this application may be a chip. The chip includes a processing unit and a communications unit. The processing unit may be, for example, a processor, and the communications unit may be, for example, an input/output interface, a pin, or a circuit. The processing unit may execute computer-executable instructions stored in a storage unit, so that the chip in a server performs the navigation methods described in the embodiments shown in FIG. 1 to FIG. 18.

Optionally, the storage unit is a storage unit in the chip, for example, a register or a cache, or the storage unit may be a storage unit that is in the radio access device end and that is located outside the chip, for example, a ROM, another type of static storage device that can store static information and instructions, or a random-access memory RAM.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on actual requirements to achieve the objectives of the solutions of the embodiments. In addition, in the accompanying drawings of the apparatus embodiments provided in this application, connection relationships between modules indicate that the modules have communication connections with each other, which may be implemented as one or more communications buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CLU, a dedicated memory, a dedicated component, and the like. Generally, any functions that can be performed by a computer program can be easily implemented by using corresponding hardware, and a specific hardware structure used to achieve a same function may be of various forms, for example, in a form of an analog circuit, a digital circuit, a dedicated circuit, or the like. However, for this application, a software program implementation is a better implementation in most cases. Based on such an understanding, the technical solutions of this application essentially or any part may be implemented in a form of a software product. The computer software product is stored in a readable storage medium, such as a floppy disk, a Universal Serial Bus (USB) flash drive, a removable hard disk, a ROM, a RAM, a magnetic disk, or an optical disc of a computer, and includes several instructions for instructing a computer device (which may be a personal computer, a server, or a network device) to perform the methods described in the embodiments of this application.

All or some of the foregoing embodiments may be implemented by using software, hardware, firmware, or any combination thereof. When software is used to implement the embodiments, the embodiments may be implemented all or partially in a form of a computer program product.

In the specification, claims, and accompanying drawings of this application, the terms "first", "second", and the like are intended to distinguish between similar objects but do not necessarily indicate a specific order or sequence. It should be understood that the data termed in such a way are interchangeable in proper circumstances so that the embodiments described herein can be implemented in an order other than the order illustrated or described herein. The term "and/or" in this application describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects. Moreover, the terms "include", "contain" and any other variants mean to cover a non-exclusive inclusion, for example, a process, method, system, product, or device that includes a series of steps or modules is not necessarily limited to those expressly listed steps or modules, but may include other steps or modules not expressly listed or inherent to such a process, method, product, or device. The naming or numbering of the steps appearing in this application does not mean that the steps in the method procedures need to be performed in a time/ logical order indicated by the naming or numbering. An execution order of the steps in the procedures that have been named or numbered can be changed according to the technical objective to be achieved, provided that same or similar technical effects can be achieved. The module division in this application is logical division, and may be other division in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic or other similar forms. This is not limited in this application. In addition, modules or submodules described as separate components may be or may not be physically separated, or may be or may not be physical modules, or may be distributed into a plurality of circuit modules. Objectives of the solutions of this application may be achieved by selecting some or all of the modules based on actual requirements.

What is claimed is:

1. A navigation method implemented by a cloud server, comprising:

receiving, by the cloud server from a sensor system including a positioning system of a vehicle, a navigation request, wherein the navigation request comprises first location information of a start place of the vehicle and second location information of a destination of the vehicle, and wherein the second location information of the destination is automatically included in the navigation request based on analyzing a time period of user navigation of the vehicle in combination with historical navigation requests comprising a frequently traveled destination of a user of the vehicle stored in a memory of the cloud server;

receiving, by the cloud server from the sensor system of the vehicle, a heading of the vehicle based on a traveling track of the vehicle, wherein the traveling track is prestored in the vehicle before obtaining the navigation request, wherein the traveling track comprises a plurality of track points that are based on positioning data of the sensor system and that are at a preset distance from a current location of the vehicle, and wherein a curvature of the track points indicates the heading;

automatically performing, by at least one processor of the cloud server, navigation planning on the vehicle based on the first location information, the second location information, the heading and a satellite positioning system to generate a navigation route and to reduce deviation corrections when the vehicle starts from a stationary position; and transmitting, by the cloud server to at least one peripheral device on the vehicle, navigation data of the navigation route.

2. The navigation method of claim 1, wherein performing the navigation planning on the vehicle based on the first location information, the second location information, and the heading comprises:

determining a first navigation direction based on the first location information and the second location information; and performing the navigation planning on the vehicle based on an included angle between the first navigation direction and the heading.

3. The navigation method of claim 2, wherein performing the navigation planning on the vehicle based on the included angle comprises sending a prompt message when the included angle falls within a first preset range, wherein the prompt message instructs the vehicle to turn around.

4. The navigation method of claim 2, wherein performing the navigation planning on the vehicle based on the included angle comprises sending a prompt message when the included angle falls within a second preset range, and wherein the prompt message instructs the vehicle to turn left or to turn right.

5. The navigation method of claim 2, wherein performing the navigation planning on the vehicle based on the included angle comprises sending a prompt message when the included angle falls within a third preset range, and wherein the prompt message instructs the vehicle to travel in the first navigation direction.

6. The navigation method of claim 1, wherein the traveling track is a segment of stored traveling track that is prestored before the navigation request is obtained and that is at a preset distance from a current location of the vehicle, wherein the traveling track comprises N track points, wherein each of the N track points indicates location information of the vehicle, wherein N is a positive integer, and wherein the navigation method further comprises determining the heading of the vehicle based on curvatures of the N track points.

7. The navigation method of claim 6, wherein determining the heading of the vehicle based on the curvatures of the N track points comprises determining the heading of the vehicle based on any two track points in the N track points when a curvature change rate of the N track points is not greater than a first preset value.

8. The navigation method of claim 6, wherein determining the heading of the vehicle based on the curvatures of the N track points comprises determining the heading of the vehicle based on a curvature change rate of the N track points and a vehicle speed when the curvature change rate is greater than a first preset value.

9. The navigation method of claim 6, further comprising obtaining, based on the traveling track, the N track points by:

determining a plurality of track points based on the traveling track; and deleting M track points from the track points based on a preset condition to obtain the N track points, wherein the preset condition comprises at least one of a first preset condition or a second preset condition, wherein the first preset condition is that curvatures of the M track points are greater than a second preset value, wherein the second preset condition is that a vehicle gear corresponding to the M track points is a neutral gear, wherein M is a positive integer, and wherein N is a positive integer.

10. The navigation method of claim 6, further comprising:

detecting a vehicle speed of the vehicle;

obtaining steering wheel angle information when detecting the vehicle speed is less than a third preset value;

determining a compensation direction based on the steering wheel angle information, a wheel track, duration, and the vehicle speed, wherein the duration is a required duration from a first moment when the vehicle speed is less than the third preset value to a second moment at which the vehicle stops, and wherein the vehicle speed is a real-time speed of the vehicle; and updating, based on the compensation direction, the heading.

11. A mobile terminal, comprising:

a communications circuit configured to:

obtain, for a vehicle having a sensor system including a positioning system, a navigation request, wherein the navigation request comprises first location information of a start place of the vehicle and second location information of a destination of the vehicle, and wherein the second location information of the destination is automatically included in the navigation request based on a time period of user navigation of the vehicle in combination with historical navigation requests comprising a frequently traveled destination of a user;

send, to the vehicle, an instruction in response to the navigation request, wherein the instruction instructs the vehicle to send a first heading of the vehicle to a cloud server for navigation planning based on the first location information and, the second location information; and send, to the cloud server, the first heading, wherein the first heading is based on a stored traveling track that comprises a plurality of track points that are obtained from the sensor system based on positioning data and that are at a preset distance from a current location of the vehicle, wherein a curvature of the track points indicates the first heading, and wherein the first heading is for determining a second heading of the vehicle; and a processor coupled to the communications circuit and configured to:

receive, from the cloud server and on at least one peripheral device, navigation data of a navigation route based on the first location information, the second location information, the heading and a satellite positioning system, wherein the navigation route reduces deviation corrections when the vehicle starts from a stationary position.

12. The mobile terminal of claim 11, wherein the processor is further configured to:

determine a first navigation direction based on the first location information and the second location information of, and perform the navigation planning based on an included angle, wherein the included angle is between the first navigation direction and the second heading of the vehicle.

13. The mobile terminal of claim 12, wherein the processor is further configured to send a prompt message when the included angle falls within a first preset range, and wherein the prompt message instructs the vehicle to turn around.

14. The mobile terminal of claim 12, wherein the processor is further configured to send a prompt message when the included angle falls within a second preset range, and wherein the prompt message instructs the vehicle to turn left or turn right.

15. The mobile terminal of claim 12, wherein the processor is further configured to send a prompt message when the included angle falls within a third preset range, and wherein the prompt message instructs the vehicle to travel in the first navigation direction.

16. The mobile terminal of claim 11, wherein the traveling track is a segment of second traveling track that is at a preset distance from a current location of the vehicle, wherein the second traveling track comprises N track points, wherein each of the N track points indicates location information of the vehicle, and wherein the first heading comprises curvatures of the N track points.

17. The mobile terminal of claim 11, wherein the communications circuit is further configured to receive compensation direction information of the vehicle, and wherein the processor is further configured to update the second heading based on the compensation direction information, wherein the compensation direction information comprises steering wheel information, a wheel track, duration, and a vehicle speed, wherein the steering wheel information is steering wheel angle information that is based on the vehicle speed being less than a third preset value, wherein the duration is a required duration from a first moment at which the vehicle speed is less than the third preset value to a second moment at which the vehicle stops, and wherein the vehicle speed is a real-time speed of the vehicle.

18. A navigation device of a vehicle, comprising:

a memory storing program instructions; and a processor coupled to the memory and configured to execute the program instructions that, when executed by the processor, cause the navigation device to:

obtain a navigation request, wherein the navigation request comprises first location information of a start place of the vehicle and second location information of a destination of the vehicle, wherein the vehicle comprises a sensor system including a positioning system configured to detect the first location information, and wherein the second location information of the destination is automatically included in the navigation request based on analyzing a time period of user navigation of the vehicle in combination with historical navigation requests comprising a frequently traveled destination of a user stored in the memory;

send, to a cloud server, the navigation request and a heading of the vehicle based on a traveling track of the vehicle for navigation planning based on the first location information, the second location information, and the heading, wherein the traveling track is generated by the sensor system based on positioning data of the sensor system, and wherein the traveling track is prestored before obtaining the navigation request and comprises a plurality of track points that are at a preset distance from a current location of the vehicle, and wherein a curvature of the track points indicates the heading;

receive, on at least one peripheral device, navigation data of a navigation route that is based on the first location information, the second location information, the heading and a satellite positioning system, wherein the vehicle comprises the at least one peripheral device;

communicate the navigation route to a user of the vehicle on the at least one peripheral device; and navigate the vehicle based on the navigation data comprising sending control signals to at least one of a steering system, an accelerator, or a brake unit of the vehicle.

19. The navigation device of claim 18, wherein the program instructions that when executed by the processor causes the navigation device to:

determine a first navigation direction based on the first location information and the second location information; and perform the navigation planning based on an included angle, wherein the included angle is between the first navigation direction and the heading.

20. The navigation device of claim 19, wherein the program instructions that when executed by the processor causes the navigation device to perform the navigation planning on the vehicle based on the included angle by sending a prompt message when the included angle falls within a first preset range, and wherein the prompt message instructs the vehicle to turn around.

\* \* \* \* \*